United States Patent
Lee et al.

(10) Patent No.: US 12,392,611 B1
(45) Date of Patent: Aug. 19, 2025

(54) MEASUREMENT PROTOCOL FOR LARGE DYNAMIC RANGE AND HIGH SENSITIVITY OF AN EVANESCENT-FIELD-MODE GUIDED ATOM INTERFEROMETER

(71) Applicant: National Technology & Engineering Solutions of Sandia, LLC, Albuquerque, NM (US)

(72) Inventors: Jongmin Lee, Albuquerque, NM (US); Weng W. Chow, Albuquerque, NM (US); Adrian Samuel Orozco, Albuquerque, NM (US); Jonathan David Sterk, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 209 days.

(21) Appl. No.: 18/367,604

(22) Filed: Sep. 13, 2023

(51) Int. Cl.
*G01C 19/62* (2006.01)
*G01P 15/093* (2006.01)

(52) U.S. Cl.
CPC ............ *G01C 19/62* (2013.01); *G01P 15/093* (2013.01)

(58) Field of Classification Search
CPC ........ G01C 19/62; G01C 19/58; G01C 19/64; G01C 21/166; G01C 21/183; G01C 21/18;

(Continued)

(56) References Cited

U.S. PATENT DOCUMENTS

| 11,133,117 B2 | 9/2021 | Larsen et al. |
| 11,545,815 B1 | 1/2023 | Lentine et al. |

(Continued)

FOREIGN PATENT DOCUMENTS

| CN | 117275791 A | * 12/2023 | ............. G21K 1/006 |
| DE | 112019003038 T5 | * 3/2021 | ............. G01C 19/58 |

(Continued)

OTHER PUBLICATIONS

U.S. Appl. No. 17/569,578, filed Jan. 6, 2022, Lee et al.

(Continued)

*Primary Examiner* — Mohamed K Amara
(74) *Attorney, Agent, or Firm* — Mark A. Dodd

(57) ABSTRACT

A large-dynamic and high-sensitive measurement protocol of an evanescent-field-mode guided atom interferometer accelerometer is disclosed. Cold atoms of a finite temperature are one-dimensionally guided in an evanescent field optical dipole trap. The first-step pathfinder protocol employs the revival of atomic coherence, i.e., the recovery of atomic fringe visibility to capture global interferometric signature to provide the information (e.g., a large-range of approximate acceleration sensing) to optimize the physical parameters for the second-step high-precision guided LPAI measurement. The contrast of atomic fringe visibility returns to unity given a specific interrogation time during the pulse sequence. To ensure the optimal interrogation time, the method employs a time-scanning sequence about the anticipated optimal interrogation time. The anticipated optimal interrogation time is determined via a conventional inertial measurement unit co-sensor or through the use of a look-up table. The method may alternatively employ a phase-scanning sequence.

20 Claims, 17 Drawing Sheets

(58) Field of Classification Search
CPC ...... G01C 21/16; G01C 21/165; G01C 19/00; G01C 21/24; G01P 15/093; G01P 15/08; G01P 21/00; G01P 15/0802; G21K 1/006; G21K 1/003; G01B 2290/55; G01B 9/02; G01B 2290/25; G01B 2290/70; G01V 7/00; G01V 7/04; G01V 7/06; G01V 8/20; G04F 5/14; G01J 9/02; G01J 3/4412; G01J 3/453; G01J 2009/0276; H04B 10/70; H04B 10/61; G01N 2021/6463; G01N 21/6404; G02F 1/2255; G02F 1/3551; G01R 33/032
See application file for complete search history.

(56) References Cited

U.S. PATENT DOCUMENTS

| | | | |
|---|---|---|---|
| 11,867,713 B2 * | 1/2024 | Guzmán | G01P 15/0802 |
| 11,892,746 B1 * | 2/2024 | Mazed | G02F 1/212 |
| 11,914,188 B1 * | 2/2024 | Lee | G02B 6/43 |
| 2010/0180680 A1 * | 7/2010 | Zaugg | G01V 7/00 73/382 G |
| 2016/0298967 A1 * | 10/2016 | Johnson | G01C 19/58 |
| 2022/0084709 A1 * | 3/2022 | Hughes | G06N 10/40 |
| 2022/0163557 A1 * | 5/2022 | Guzmán | G01P 15/093 |
| 2025/0094380 A1 * | 3/2025 | Mazed | G02F 1/212 |

FOREIGN PATENT DOCUMENTS

| | | | | |
|---|---|---|---|---|
| EP | 3586084 B1 | * | 11/2024 | ............ G01C 21/16 |
| GB | 2430541 A | * | 3/2007 | ............... H05H 3/02 |
| WO | WO-2016069341 A1 | * | 5/2016 | ............ G01P 15/093 |

OTHER PUBLICATIONS

Afek, G. et al., "Revival of Raman coherence of trapped atoms," Physical Review A (2017) 96:043831, 7 pages.

Bernard, J. et al., "Atom interferometry using σ+-σ-Raman transitions between |F=1,mF=∓1? and |F=2,mF=±1?," Physical Review A (2022) 105:033318, 12 pages.

Gehl, M. et al., "Characterization of suspended membrane waveguides towards a photonic atom trap integrated platform," Optics Express (2021) 29(9):13129-13140.

Lee, J. et al., Demonstration of a MOT in a sub-millimeter membrane hole, Scientific Reports (2021) 11:8807, 8 pages.

Ovchinnikov, Y. B., "A perspective on integrated atomo-photonic waveguide circuits," Appl. Phys. Lett. (2022) 120:010502, 6 pages.

Wang, L. et al., "Effect of an echo sequence to a trapped single-atom interferometer with photon momentum kicks," Optics Express (2020) 28(10):15038-15049.

* cited by examiner

MEASUREMENT PROTOCOL FOR LARGE DYNAMIC RANGE AND HIGH SENSITIVITY OF AN EVANESCENT-FIELD-MODE GUIDED ATOM INTERFEROMETER

STATEMENT OF GOVERNMENT SUPPORT

This invention was made with Government support under Contract No. DE-NA0003525 awarded by the United States Department of Energy/National Nuclear Security Administration. The U.S. Government has certain rights in the invention.

BACKGROUND OF THE INVENTION

Field of the Invention

The present invention relates to the coherence revival of a guided light-pulse atom interferometer with evanescent-field modes, resulting in acceleration sensing with a large dynamic range.

Brief Description of the Related Art

Quantum gravity and inertial sensors employing cold atoms and light-pulse atom interferometer (LPAI) technology have achieved state-of-the-art sensitivities and accuracies in the laboratory, comparable to the best conventional sensors. Following sensor miniaturization and ruggedization, quantum gravity and inertial sensors are capable of providing a novel solution for advanced positional awareness and precision inertial navigation with minimal reliance on a global positioning system (GPS). Currently, experiments are being performed to explore the physics challenges of real-world situations and extend sensor operation beyond the laboratory. To achieve this goal, quantum gravity and inertial sensors require immunity to cross-axis acceleration/rotation, on-axis acceleration (Doppler shift), and vibration-induced noise in highly dynamic environments, which needs to be addressed with advanced control schemes and vibration isolation platforms, such as the LPAI feedforward algorithm and a conventional inertial measurement unit (IMU) co-sensor that provides information on the movement of a sensor platform. As an alternative approach, a guided atom interferometer confines atoms in the transverse plane with an optical or magnetic trap and allows for free atomic motion along the direction of atom guiding. This approach can innately maintain good spatial overlap between 1-D guided atoms and light pulses in LPAI operation, and compensate for cross-axis acceleration/rotation.

The emerging technology of integrated photonics has been applied to LPAI technology: (1) multiple light sources for LPAI operation are generated, modulated, and amplified through photonic integrated circuit (PIC) components, and (2) membrane photonic atom-trap integrated platforms enable direct cold atom generation around membrane photonics and offer an evanescent-field (EF) mode via a ridge waveguide (across the transparent membrane) whose profile has been extended to free space and enables interaction with atoms. These atom-trap integrated platforms can include linear, circular, or arbitrary atom guiding geometries. Atom-light interaction and atom trapping/guiding with EF modes have been proven via nanofiber testbeds that provide several-hundred nanometer EF modes through a half-micrometer-diameter tapered optical fiber.

As a disruptive approach, an EF-mode guided atom interferometer can provide strong atom-light interaction due to the small mode area; reduce the size, weight, power, and cost (SWaP-C) of quantum gravity and inertial sensors towards a chip-scale, low-SWaP arrayed sensor (possible for common-mode noise rejection towards high sensitivity) using integrated photonics; and has the potential to reduce the sensitivity to cross-axis acceleration and rotation. In particular, an EF optical dipole trap (EF-ODT) uses two-color (red-/blue-detuned) travelling waves for atom guiding, where the blue-detuned trap beam compensates for Van der Waals potential near the surface of the optical fiber and the red-detuned trap beam creates a trapping potential within a few hundred nanometer proximity from the surface of the optical fiber. For example, linear or closed-area atom-guiding geometry configures guided LPAI accelerometers or gyroscopes, respectively, using 1-D guided atoms in an EF-ODT.

To increase the dynamic range of an LPAI in high acceleration conditions, quantum-classical sensor fusion has been investigated for acceleration sensing. This sensor fusion combines a classical sensor having a large dynamic range and low sensitivity to provide approximate acceleration and vibration spectra of a sensor platform, with a quantum sensor having a small dynamic range and high sensitivity to deliver precise acceleration based on the feedforward process with approximate acceleration sensing. Beyond this hybrid approach, both the first-step pathfinder acceleration measurement and the second-step high-precision acceleration measurement can be completed using quantum sensing measurement protocols. In particular, the coherence revival of trapped atoms in a free-space ODT was experimentally shown in G. Afek et. al., "Revival of Raman coherence of trapped atoms," Physical Review A vol. no. 96, art. no. 043831 (2017), at the integer multiple of a trap oscillation time under stationary laboratory conditions. This approach uses Ramsey interferometry time-scan measurements ($\pi/2 \rightarrow T+\delta T \rightarrow \pi \rightarrow T+\delta T \rightarrow \pi/2$) with counter-propagating Doppler-sensitive Raman pulses that coherently address internal states (i.e., microwave ground-state transition) and deliver state-dependent photon recoils on atoms.

The coherence revival of 1-D guided atoms in an EF-ODT can be used as the first-step pathfinder LPAI measurement protocol to find an approximate acceleration, which performs several Ramsey interferometry phase-scan measurement [$\pi/2 \rightarrow T \rightarrow \pi \rightarrow T \rightarrow \pi/2$ ($\delta\phi$=0 to $2\pi$)] and obtain atomic fringe visibilities at multiple interrogation time samples ($T=T_1$, $T_2$, and $T_3$) to extract global interferometric signature. The pathfinder protocol provides the information to optimize several LPAI parameters (e.g., Raman detuning/intensity/phase) for the second-step high-precision LPAI measurement.

In these prior art systems (an EF-mode guided atom interferometer), there are several characteristics that need to be considered when driving atom interferometry light-pulse sequence (e.g., Doppler-sensitive EF-mode Raman beams) on 1-D guided atoms with EF modes, including: (1) higher anharmonicity in the transverse plane of an EF-ODT, higher trap frequencies (e.g., 100 to 1000 kHz) than a free-space ODT (e.g., 100 to 1 kHz), and a non-transverse electric field component (i.e., longitudinal mode) due to tight mode confinement, (2) the mixture of transverse trap states via transverse motional excitation, which results from the gradient of EF-mode Raman beams (i.e., evanescently decaying fields) during LPAI pulse sequence, (3) nonuniform atom-light interaction due to evanescently decaying fields, and (4) the Doppler-broadened velocity class of guided atoms along the direction of 1-D atom guiding. Thus, to overcome those complexity and meet the need exist for a system, the global interferometric signature has been exploited for the first-step pathfinder protocol.

SUMMARY OF THE INVENTION

To increase the dynamic range of an LPAI in a high acceleration environment, the coherence revival of an EF-mode guided atom interferometer, i.e., the recovery of atomic fringe visibility, can be used as a pathfinder protocol to capture global interferometric signature to provide the information (e.g., a large-range of approximate acceleration sensing) to optimize the physical parameters of high-precision LPAI measurement. The contrast of atomic fringe visibility recovers to unity given a specific interrogation time during the pathfinder protocol. This new method of high-sensitivity acceleration measurements will aid in the realization of compact deployable cold atom inertial sensors.

The demonstration of a 1-D EF-mode guided atom interferometer (AI), in accordance with at least one embodiment of the present invention, is significant for a deployable quantum gravity and inertial sensor due to it being compact, robust, energy efficient, and manufacturable, while exhibiting extended dynamic range. The EF ODT confines atoms in the transverse plane and allows the atoms to move freely along the direction of atom guiding, which can achieve strong atom-light interaction with reduced size, weight, and power (SWaP). In this embodiment, the revival of atomic coherence employs atoms of a finite temperature in the trap with a finite trap depth. Under optimal physical settings, the revival of atomic coherence captured in the pathfinder protocol can be used for high-sensitivity acceleration measurement in a 1-D guided AI accelerometer.

In at least one embodiment of the invention, a method for measuring acceleration comprising the steps of providing a light-pulse atom interferometer (LPAI) accelerometer structure (the LPAI accelerometer structure including a suspended waveguide), forming a magneto-optical trap (MOT) about the suspended waveguide, laser cooling atoms, forming an evanescent field optical dipole trap (EF ODT) about the suspended waveguide, loading at least a portion of the laser cooled atoms into the EF ODT, determining an optimal interrogation time ($T_0$) to effect revival of Raman coherence in a measurement of the thus loaded laser cooled atoms, undertaking an LPAI optical sequence, measuring a population of one or more states of the loaded laser cooled atoms after the LPAI optical sequence, repeating the steps of forming a magneto-optical trap through measuring a population to thereby implement at least one of a time-scanning sequence or a phase-scanning sequence, and determining an acceleration based upon the measured populations over the at least one of a time-scanning sequence or a phase scanning sequence.

In various embodiments, the LPAI accelerometer structure further includes a substrate having an opening formed therein and a membrane that extends across at least a portion of the opening formed in the substrate, the suspended waveguide being disposed on the membrane such that the suspended waveguide is suspended over the opening in the substrate; the step of forming a MOT employs a magnetic field system establishing a magnetic field gradient about the suspended waveguide; the step of laser cooling atoms includes subjecting an atomic cloud about the suspended waveguide to a plurality of cooling beams; the plurality of cooling beams has a wavelength that is red-detuned with respect to a resonant optical transition of the laser cooled atoms; and the step of forming an EF ODT includes emitting a red-detuned trapping beam such that red-detuned light propagates in the suspended waveguide (the red-detuned trapping beam being red-detuned with respect to a resonant optical transition of the loaded laser cooled atoms), and emitting a blue-detuned trapping beam such that blue-detuned light propagates in the suspended waveguide (the blue-detuned trapping beam being blue-detuned with respect to the resonant optical transition of the loaded laser cooled atoms, whereby propagation of the red-detuned light and the blue-detuned light causes formation of the EF-ODT).

In other embodiments, the step of determining $T_0$ includes determining an approximate acceleration using at least one of an inertial measurement unit (IMU) co-sensor or a look-up table based on an EF-mode guided LPAI model or experimental data ($T_0$ being a function of the thus determined approximate acceleration); the LPAI optical sequence including three Raman pulses that respectively separate, redirect, and recombine the loaded laser cooled atoms (the respective separating, redirecting, and recombining along a 1-D axial direction of the suspended waveguide, each of the three Raman pulses including a pair of counter-propagating beams); a first of the pair of counter-propagating beams being red-detuned with respect to a resonant optical transition of the loaded laser cooled atoms and a second of the pair of counter-propagating beams being blue-detuned with respect to the resonant optical transition of the loaded laser cooled atoms; the three Raman pulses include, in order, a $$\frac{\pi}{2}$$

separating pulse, a $\pi$ redirecting pulse, and a $$\frac{\pi}{2}$$

recombining pulse (with an interrogation time T between the $$\frac{\pi}{2}$$

separating and the $\pi$ redirecting pulses and between the $\pi$ redirecting and the $$\frac{\pi}{2}$$

a recombining pulses); the time-scanning sequence employing a plurality of LPAI optical sequences (each of the plurality of LPAI optical sequences having a corresponding interrogation time T equal to $T_0$ plus a corresponding time-scanning factor $\delta T$); each of the corresponding time-scanning factors $\delta T$ falling within a range of one of $\pm 10\%$ $T_0$, $\pm 25\%$ $T_0$, or $\pm 50\%$ $T_0$; the phase-scanning sequence employing a plurality of LPAI optical sequences, each of the plurality of LPAI optical sequences having a $$\frac{\pi}{2}$$

recombining pulse with a respective phase $\delta\varphi$ corresponding to a phase of the microwave beat-note frequency of the two counter-propagating Raman beams; and the respective phase $\delta\varphi$ for each of the plurality of LPAI optical sequences falls within a range of 0 to $2\pi$.

In still other embodiments, the step of measuring a population includes emitting a probe beam (the probe beam interacting with the loaded laser cooled atoms, wherein interaction of the probe beam with the loaded laser cooled atoms is indicative of a probability associated with a state of the loaded laser cooled atoms, the probability based upon the motion of the loaded laser cooled atoms) and detecting the thus interacted probe beam; and a wavelength of the probe beam corresponding to a resonant optical transition of the loaded laser cooled atoms.

In at least one embodiment of the invention, an accelerometer comprises a light-pulse atom interferometer (LPAI) accelerometer structure (the LPAI accelerometer structure including a suspended waveguide), a magnetic field system establishing a magnetic field gradient about the suspended waveguide, a laser system (the laser system emitting a red-detuned trapping beam such that red-detuned light propagates in the suspended waveguide, the red-detuned trapping beam being red-detuned with respect to a resonant optical transition of atoms in an atomic cloud about the suspended waveguide, emitting a blue-detuned trapping beam such that blue-detuned light propagates in the suspended waveguide, the blue-detuned trapping beam being blue-detuned with respect to the resonant optical transition of atoms in the atomic cloud about the suspended waveguide, whereby propagation of the red-detuned light and the blue-detuned light causes formation of an evanescent field-optical dipole trap (EF-ODT), emitting a plurality of orthogonal or counter-propagating cooling beams having a wavelength that is blue-detuned with respect to the resonant optical transition of atoms in the atomic cloud about the suspended waveguide, the plurality of orthogonal or counter-propagating cooling beams cooling the atoms in the atomic cloud about the suspended waveguide thereby creating laser cooled atoms, emitting a first of a pair of Raman counter-propagating beams, the first of the pair of Raman counter-propagating beams being red-detuned with respect to a resonant optical transition of the laser cooled atoms, emitting a second of the pair of Raman counter-propagating beams, the second of the pair of Raman counter-propagating beams being blue-detuned with respect to the resonant optical transition of the laser cooled atoms, and emitting a probe beam having a wavelength corresponding to the resonant optical transition of the laser cooled atoms), an optical detector detecting the thus interacted probe beam, an inertial measurement unit co-sensor determining an approximate acceleration, and a processor (the processor undertaking the steps of determining an optimal interrogation time (To) to effect revival of Raman coherence in a measurement of the laser cooled atoms based upon the approximate acceleration, commanding the laser system to undertake an LPAI optical sequence (the LPAI optical sequence including three Raman pulses that respectively separate, redirect, and recombine the laser cooled atoms, the respective separating, redirecting, and recombining along a 1-D axial direction of the suspended waveguide, each of the three Raman pulses including the pair of Raman counter-propagating beams), determining a population of one or more states of the loaded laser cooled atoms after the LPAI optical sequence based upon an output of the optical detector, repeating the steps of commanding the laser system to undertake an LPAI optical sequence and measuring a population to thereby implement at least one of a time-scanning sequence or a phase-scanning sequence, and determining an acceleration based upon the measured populations over the at least one of a time-scanning sequence or a phase scanning sequence).

In various embodiments, the three Raman pulses include, in order, a $$\frac{\pi}{2}$$

separating pulse, a $\pi$ redirecting pulse, and a $$\frac{\pi}{2}$$

recombining pulse, with an interrogation time T between the $$\frac{\pi}{2}$$

separating and the $\pi$ redirecting pulses and between the $\pi$ redirecting and the $$\frac{\pi}{2}$$

a recombining pulses; the time-scanning sequence about $T_0$ employing a plurality of LPAI optical sequences, each of the plurality of LPAI optical sequences having a corresponding interrogation time T equal to $T_0$ plus a corresponding time-scanning factor $\delta T$ (each of the corresponding time-scanning factors $\delta T$ falling within a range of one of $\pm 10\%$ $T_0$, $\pm 25\%$ $T_0$, or $\pm 50\%$ $T_0$); and the phase-scanning sequence employing a plurality of LPAI optical sequences (each of the plurality of LPAI optical sequences having a $$\frac{\pi}{2}$$

recombining pulse with a respective phase $\delta\varphi$ corresponding to a phase of the microwave beat-note frequency of the two counter-propagating Raman beams, the respective phase $\delta\phi$ for each of the plurality of LPAI optical sequences falling within a range of 0 to $2\pi$).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 1A illustrates an EF ODT with a nanofiber platform that may be used in accordance with one or more embodiments of the present invention, while

FIG. 2A illustrates a light-pulse atom interferometer (LPAI) light-pulse sequence that may be used in accordance with one or more embodiments of the present invention, while

FIG. 3A illustrates the LPAI detection fringe visibilities with an LPAI time-/phase-scan sensing method resulting from an EF-mode guided LPAI light-pulse sequence that may be used in accordance with one or more embodiments of the present invention, while

FIG. 6A is a flowchart illustrating the experimental sequence of an EF-mode guided LPAI for acceleration sensing in accordance with one or more embodiments of the present invention, while

FIG. 7A illustrates a timing and detuning diagram of an EF-mode guided LPAI accelerometer with the various optical beams for an LPAI time-/phase-scan sensing method in accordance with one or more embodiments of the present invention, while

DETAILED DESCRIPTION OF THE INVENTION

The terms "a" and "an" do not denote a limitation of quantity, but rather denote the presence of at least one of the referenced items. The term "or" means "and/or." The terms "comprising," "having," "including," and "containing" are to be construed as open-ended terms (i.e., meaning "including, but not limited to").

Figure 1A:
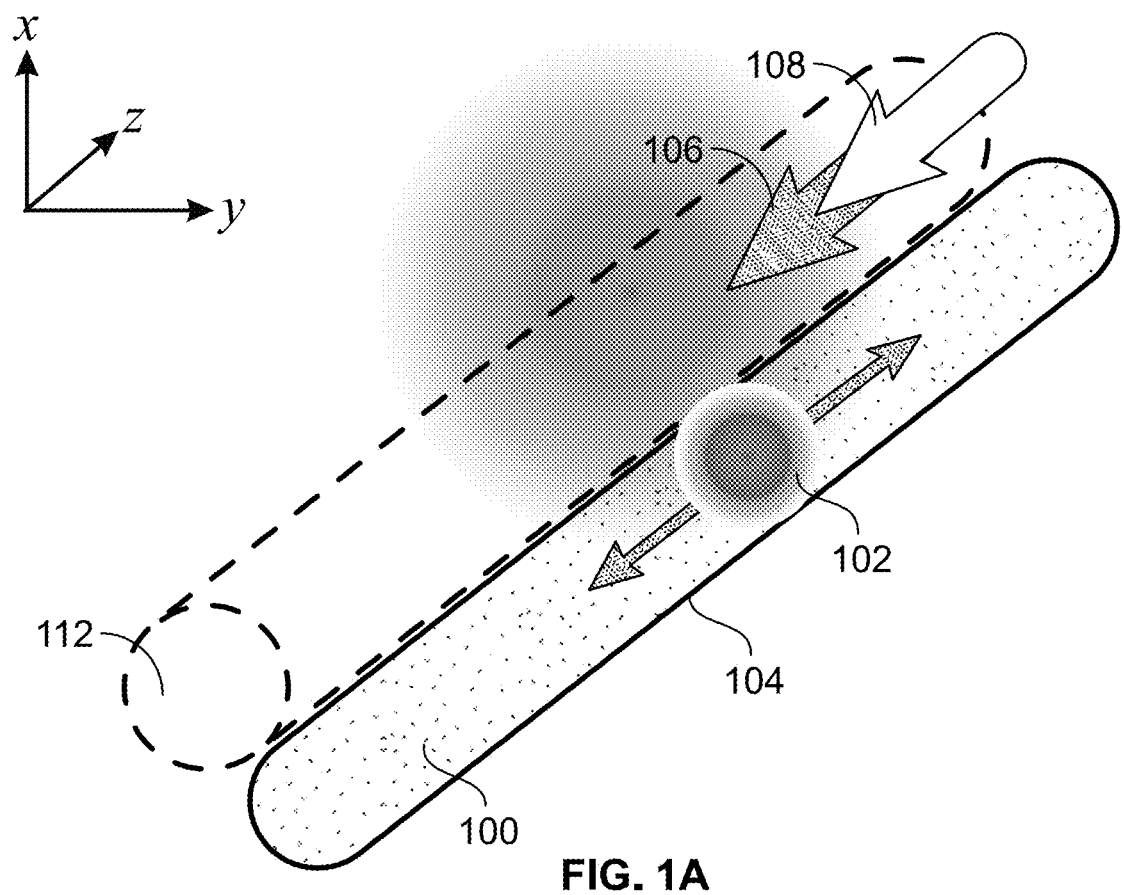
Figure 1B:
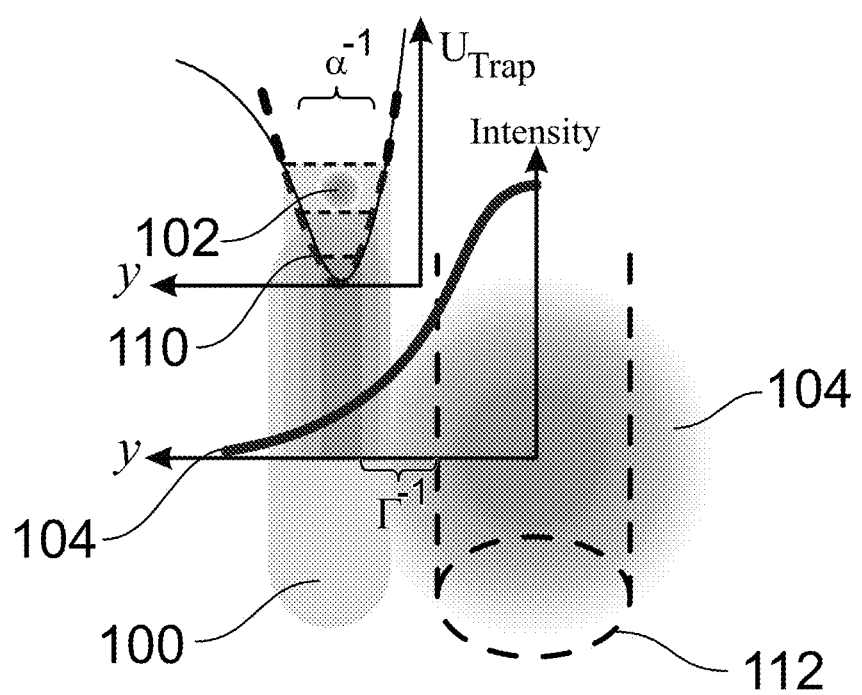
FIG. 1B illustrates the corresponding evanescently decaying guided mode and ODT states.

In an evanescent field (EF) optical dipole trap (ODT) 100, such as that illustrated in FIG. 1A, optically guided atoms 102 are coming from an atom loading process, which simultaneously happens with a sub-Doppler cooling process. In the loading process, atom distribution in the EF ODT 100 follows a Boltzmann distribution according to a mean atomic temperature, where colder atoms are located at the EF ODT 100 with a deeper trap depth, i.e., with more ac Stark shift, while hotter atoms are confined at the EF ODT 100 with a shallower trap depth, i.e., less ac Stark shift. Non-uniform ac Stark shift leads to atomic decoherence of optically guided atoms 102 even with a spatially homogeneous free-space beam (or microwave field). An EF mode 104 makes individually-confined atoms experience a spatially non-uniform atom-light interaction because the optically guided atoms 102 in each EF ODT 100 have a corresponding spatial distribution of an atomic wave-function and experience an evanescently decaying guided mode, as illustrated in FIG. 1B. This EF ODT 100 provides strong atom-light interaction and decreases the size, weight, and power of guided atomic sensors due to the small mode area of light guiding structures. The EF ODT 100 is leveraged by two copropagating travelling-wave, blue- and red-detuned EF trapping beams 106, 108. The blue-detuned beam 106 compensates for the near-surface, attractive Van der Waals potential, and the red-detuned beam 108 creates an optical potential minimum 110 together with the blue-detuned beam 106 at a couple of hundred nanometer proximity from the surface of the nanofiber 112.

Figure 2A:
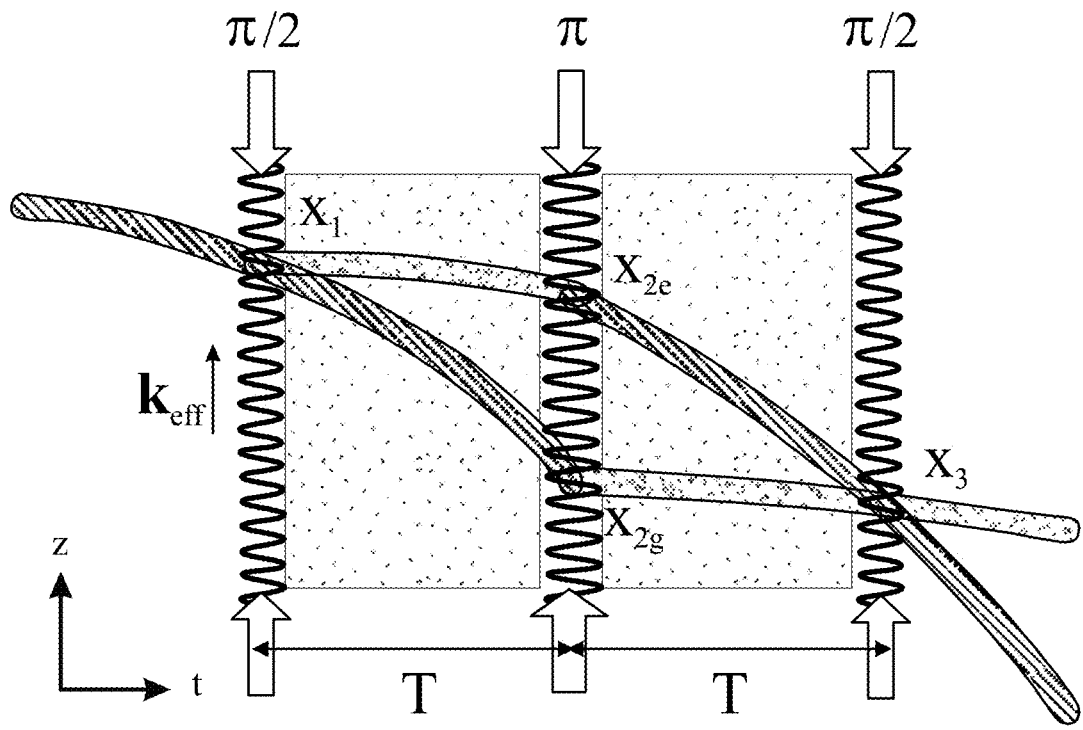
Figure 2B:
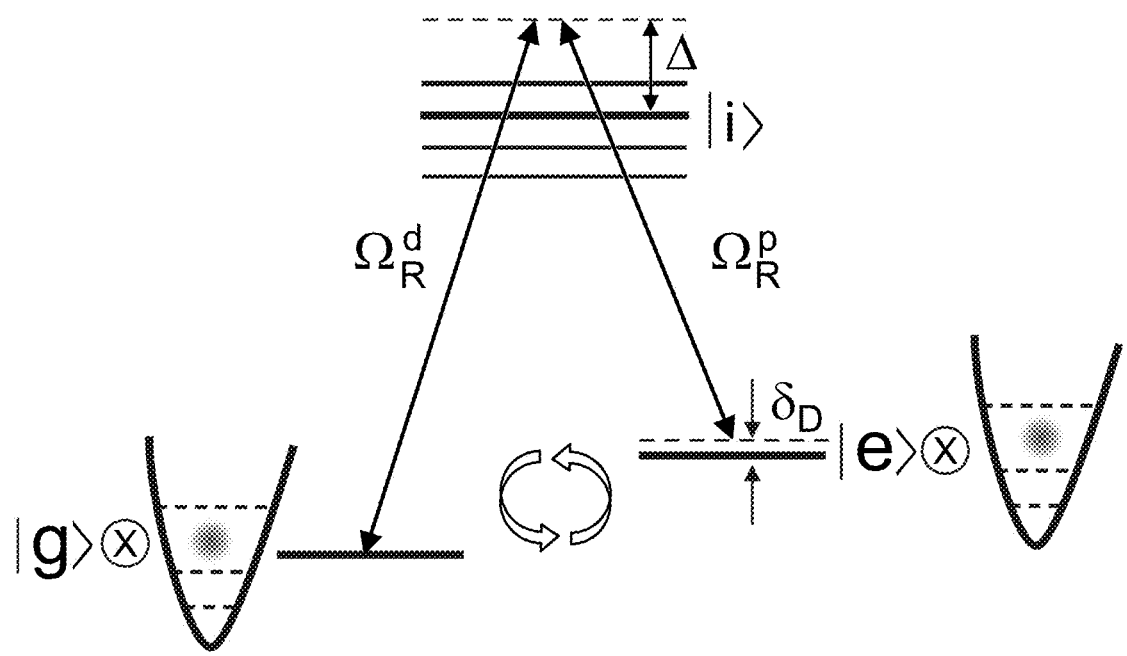
FIG. 2B illustrates the corresponding three-level atomic system coupled with transverse harmonic traps.

A light-pulse atom interferometer (LPAI) accelerometer uses a light-pulse sequence, based on stimulated Raman transitions, for example, $\pi/2 \rightarrow T \rightarrow \pi \rightarrow T \rightarrow \pi/2$, as illustrated in FIG. 2A. Note that FIG. 2A illustrates a free-space LPAI, corresponding to the second column of Table 1 below. The sensitivity of the LPAI accelerometer has a quadratic dependence on T, i.e., the interrogation time. Analogous to an optical Mach-Zehnder interferometer, three light pulses sequentially split, redirect, and re-combine atomic wave-packets for matterwave interference. Stimulated Raman transitions are a two-photon coherent process in a three-level atomic system, as illustrated in FIG. 2B, which addresses the internal state of atoms and state-dependent photon recoils ($\hbar \vec{k}_{eff}$) to atoms using two counter-propagating Doppler-sensitive Raman beams that require a $\sigma^+$-$\sigma^+$, $\sigma^-$-$\sigma^-$, or lin-perp-lin polarization configuration. Note that FIG. 2B illustrates a free-space guided LPAI, corresponding to the third column of Table 1 below, where atoms are guided in the transverse plane using a free-space beam. Along the acceleration sensing axis (no trap), all the free-space LPAIs, free-space guided LPAIs, and EF-mode guided LPAIs (the fourth column of Table 1 below) can be described by internal atomic states, based on a three-level atomic system, due to no confinement along the sensing axis. For example, $^{87}$Rb atoms have two ground states $|g\rangle = |F=1, m_F=0\rangle$ and $|e\rangle = |F=2, m_F=0\rangle$ in $5S_{1/2}$, whose microwave transition frequency is 6.834 682 610 GHz, and an optically-excited atomic state is $|i\rangle = |F'=2, m_{F'}=\pm1\rangle$ in $5P_{3/2}$, where $m_F$ and $m_{F'}$ are magnetic sub-levels. On the transverse plane, free-space guided LPAIs and EF-mode guided LPAIs are configured by the free-space ODT and the EF ODT 100, respectively, that results in the two ground states $|g\rangle$ and $|e\rangle$ corresponding to transverse trap states, in contrast to the two ground states only in a free-space LPAI, which has no transverse trap states. These trap states necessarily place an additional constraint on the stimulated Raman transitions.

In free-space LPAIs, free-space guided LPAIs, and EF guided LPAIs, on-axis acceleration of a sensor platform creates relative movement between the atoms/guided atoms and the Doppler-sensitive Raman beams. Therefore, atoms/guided atoms (freely moving along the axial direction and confined in the transverse plane) experience a Doppler shift that leads to a variation of two-photon detuning $\delta$ of Doppler-sensitive Raman beams. In the EF ODT, EF-mode Doppler-sensitive Raman transitions deliver state-dependent photon recoils on freely moving atoms along the axial direction and couples both internal atomic states and transverse trap states due to the optical field gradient of EF-mode Raman beams along the radial direction on the transverse plane, which allows the atomic transition between $|g\rangle Ä|P_0\rangle_{axial} Ä\Sigma_i C_i|n_{trap}=i\rangle_{trans}$ and $|e\rangle Ä|P_0+\hbar k_{\textit{eff}}\rangle_{axial} Ä\Sigma_j C_j|n_{trap}=j\rangle_{trans}$. An initial atomic temperature following Boltzmann distribution determines the distribution of trap states ($C_i$ and $C_j$), where each trap state induces additional light shifts and requires slightly different two-photon detuning $\delta$. Therefore, due to the on-axis acceleration affecting the two-photon detuning of the Doppler-sensitive Raman beams, the optimal transition trap states after the Raman light-pulse sequence may be altered. Specifically, one may tune the trap state energy levels as a function of the anticipated acceleration for a given atomic temperature. This tuning of the trap state energy levels in the EF ODT 100 is implemented by adjusting the power of each of the blue- and red-detuned EF trapping beams 106, 108.

The sequence of an LPAI can be accomplished with an appropriate choice of a single-photon detuning $\Delta$, two-photon detuning $\delta_D$, single-photon Rabi frequencies $\Omega_d$ ($|g\rangle \leftrightarrow |i\rangle$) and $\Omega_p$ ($|e\rangle \leftrightarrow |i\rangle$), and an effective Rabi frequency $\Omega_{\textit{eff}} = (\Omega_d \cdot \Omega_d)/2\Delta$. The first Raman pulse acts as a beam splitter ($\pi/2$-pulse) creating a superposition of two ground states of $|g, \vec{p}_0\rangle$ and $|e, \vec{p}_0+\hbar k_{\textit{eff}}\rangle$ by transferring photon recoils to the $|g, \vec{p}_0\rangle$ state atoms. After an interrogation time T, the second Raman pulse operates as a mirror ($\pi$-pulse) and transfers each atomic wavepackets to an opposite internal state with a corresponding momentum state: $|g, \vec{p}_0\rangle \leftrightarrow |e, \vec{p}_0+\hbar k_{\textit{eff}}\rangle$. After another interrogation time T, the third Raman pulse works as a beam splitter ($\pi/2$-pulse) and recombines the atomic wavepackets for matterwave interference.

At the end of the LPAI operation, the atomic population is measured via fluorescence detection. The acceleration value is encoded in the probability $P=\frac{1}{2}(1-\cos(\Delta\phi))$, where for a platform acceleration $\vec{a}$, $\Delta\phi = (\vec{k}_{\textit{eff}} \cdot \vec{a})T^2$, where v is the velocity of the atom and $$\vec{k}_{\textit{eff}} = \hat{k}\frac{4\pi}{\lambda}$$

is the effective wavevector of the Raman beams. This ratio depends on the phase difference, $\Delta\phi$, between the interferometer paths. This phase difference is used as a very sensitive probe of the environment the atoms travel through. In the case of gravitational acceleration, the relevant contribution varies with $$\Delta\phi = -\vec{k}_{\textit{eff}} \cdot \vec{g}\left(T^2 + \tau_\pi\left(1+\frac{2}{\pi}\right)T\right),$$

where $\tau_\pi$, is the duration of the $\pi$-pulse and $\vec{g}$ is the acceleration due to gravity. By analyzing this equation, one can optimize the sensitivity of the LPAI. A longer interrogation time T leads to a higher sensitivity for the LPAI accelerometer.

Acceleration sensing can be performed with either phase-scan or time-scan LPAI fringe measurement. First, the phase-scan LPAI fringe measurement is based on the phase shift of the LPAI fringe and has a limited measurement bandwidth. The measurement sequence is $$\frac{\pi}{2}(\varphi_0) \to T \to \pi(\varphi_0) \to T \to \frac{\pi}{2}(\varphi_0 + \delta\varphi)$$

with a fixed interrogation time T. The phase ($\varphi$) of the third Raman pulse $$\left(\frac{\pi}{2}\right)$$

is varied from 0 to $2\pi$ during the phase scan where $\varphi$ is the phase of microwave beat-note frequency of two counter-propagating Doppler-sensitive Raman beams. Acceleration can be measured along the slope of a fringe, but higher acceleration can induce fringe hopping, which needs to be resolved using an inertial measurement unit (IMU) co-sensor and an LPAI feedforward processor.

Second, the time-scan LPAI fringe measurement is based on acceleration-induced fringe chirping due to the Doppler shift. The measurement sequence is $$\frac{\pi}{2} \to T_0 + \delta T \to \pi \to T_0 + \delta T \to \frac{\pi}{2}.$$

During the time scan, the LPAI fringe becomes chirped as atoms are accelerated toward or away from a resonant light for a plurality of $T_0+\delta T$ interrogation times. This is because the atoms experience Doppler-shifted atomic resonances according to each Raman beam in the opposite propagating direction, which affects a two-photon detuning $\delta_D$, i.e., Doppler detuning, on LPAI operation. For free-space LPAIs, free-space guided LPAIs, and EF-mode guided LPAIs, the LPAI fringe oscillates, becomes chirped, and decays to zero due to Doppler shift along the on-axis direction, i.e., an acceleration sensing axis. Based on the data fitting with a model, one can measure acceleration and statistical uncertainty with the LPAI.

Optically guided atoms in an EF ODT can interact with EF-mode Raman beams (or possibly with free-space Raman beams). As illustrated in FIG. 1B, atoms are confined in the x-y plane, and freely move along the z axis, where the evanescent interrogating fields decay with $\exp(-\Gamma_y)$. The mixed transverse trap state under unresolved sideband regime and spatially non-uniform atom-light interaction reduces the LPAI fringe, which are related to linear atom guiding types and Raman beam parameters. The LPAI fringe recovery, i.e., the revival of the Raman coherence, in accordance with one or more embodiments, occurs by selecting an interrogation time corresponding to an integer multiple of the trap frequency and Doppler shift resulting from acceleration. See, for example, G. Afek et al., "Revival of Raman coherence of trapped atoms," Physical Review A, vol. 96, art. no. 043831 (2017). Assuming that the atomic population is distributed following a Boltzmann distribution for a mean atomic temperature, the trap potential may be approximated by a simple harmonic oscillator potential, as illustrated in FIG. 1B. Then, the trapped part of the atomic wavefunctions is described by Hermite Gaussian functions, each with an envelope, $$\exp\left(\frac{-\alpha^2 y^2}{2}\right).$$

Figure 3A:
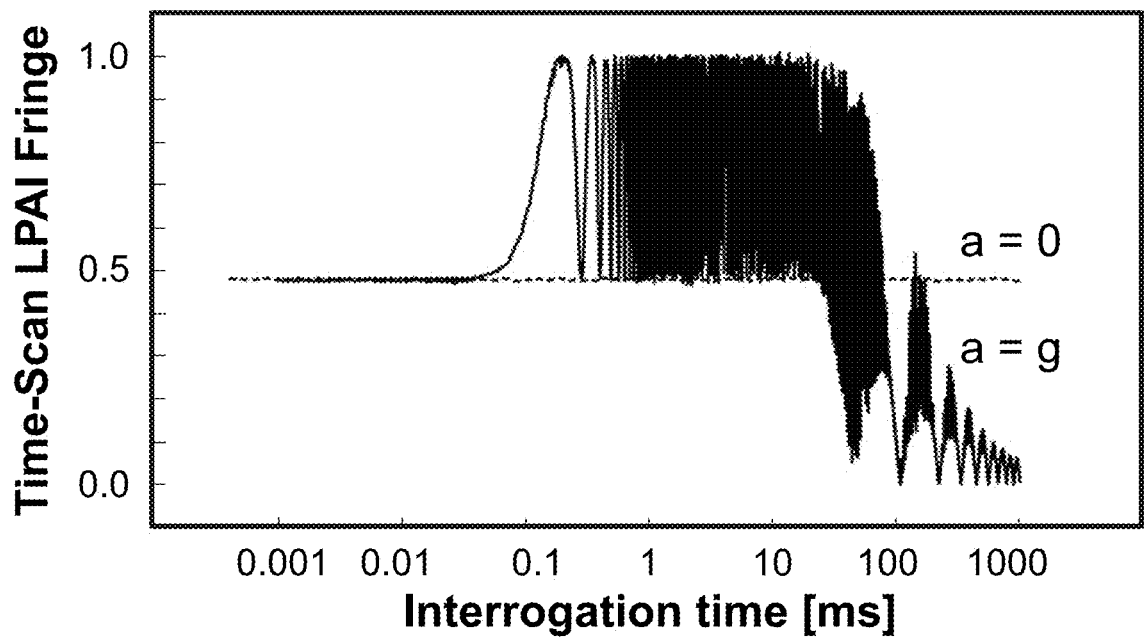
Figure 3B:
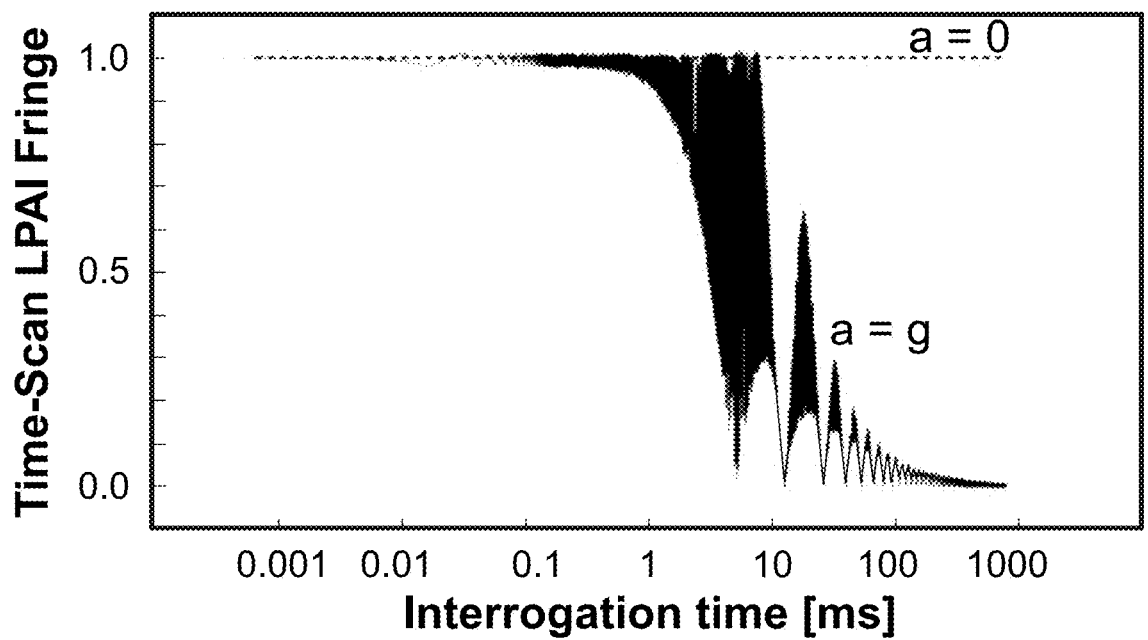
FIG. 3B illustrates the LPAI detection fringe visibilities with an LPAI time-/phase-scan sensing method resulting from a free-space LPAI light-pulse sequence.

The variation of an EF mode over the extent of the Hermite Gassians will give rise to state mixing and reduce the LPAI fringe visibilities, as illustrated in FIG. 3A, which may be compared to the LPAI fringe visibilities of a free-space LPAI, as illustrated in FIG. 3B. The dashed line, corresponding to non-accelerating atoms, depicts the expected LPAI fringe visibility reduction caused by the spatial decaying EF modes.

The following Table 1 summarizes some of the differences between a free-space LPAI system and a guided LPAI system with an EF ODT as used in various embodiments of the present invention.

gation direction (nanofiber mode), which can drive additional undesirable transitions (e.g., non-zero magnetic sublevels, $m_f \neq 0$), thereby reducing signal contrast. See, J. Bernard, et al., "Atom interferometry using $\sigma^+$-$\sigma^-$ Raman transitions between $|F=1, m_f=\mp 1\rangle$ and $|F=2, m_f=\pm 1\rangle$," Physical Review A, vol. 105, art. no. 033318 (2022) and M. S. Larsen et al., "Atomic Interferometer System," U.S. Pat. No. 11,133,117, related to free-space LPAIs, which show that lin//lin (or $\sigma^+\sigma^-$) Raman beams will enable state-dependent momentum kicks on non-zero magnetic sublevels, for example, $|F=1, m_f=-1\rangle \leftrightarrow |F=2, m_f=+1\rangle$, for atom interferometry with Rb atoms. The lin//lin Raman beams could make nanofiber or waveguide mode more reliable than other polarization configurations for Doppler-sensitive Raman transitions. Specifically, a linearly-polarized, single, two-tone input Raman beam can simply create a linearly-polarized retro-reflected Raman beam, with both input and retro-reflected Raman beams sharing the common mode path, thereby reducing vibration-induced noise.

Second, individually-confined atoms in each trap site experience a nonuniform atom-light interaction, i.e., a spatially varying atom-light interaction, due to the evanescently decaying field (see FIG. 1B), which causes dephasing of the

TABLE 1

LPAI Accelerometer Comparison.

| Parameter | Free-Space LPAI | Free-Space Guided LPAI | EF-Mode Guided LPAI |
|---|---|---|---|
| Acceleration sensing | One-axis with state-dependent photon recoils | One-axis with state-dependent photon recoils | One-axis with state-dependent photon recoils |
| Guiding atoms | N/A | A single trapping beam using a travelling wave | Two EF-mode trapping beams using travelling waves |
| On-axis (z axis) | 1-D free-space motion with free-space Raman beams | 1-D free-space motion with free-space Raman beams | 1-D free-space motion with EF-mode Raman beams |
| Off-axis (xy plane) | 2-D free-space motion in the transverse plane | 2D trapped motion in the transverse plane | 2-D trapped motion in the transverse plane |
| Initial state | Free-space 3-D Boltzmann distribution | Boltzmann distribution including transverse trap states | Boltzmann distribution including transverse trap states |
| EF-mode Raman | N/A | N/A | Coherent momentum kicks on the transverse trap states |
| Light shifts | Raman beam only | Raman and free-space trapping beams | Raman and EF-mode trapping beams |

There are several challenges when using nanofiber coupled Raman fields in conjunction with an EF ODT. First, the EF-ODT based on a nanofiber or a waveguide has a higher anharmonicity in the transverse plane and higher trap frequencies (e.g., 100 to 1000 kHz) than a free-space ODT (e.g., 100 to 1 kHz). In addition, the fundamental EF mode has a non-transverse electric field component (i.e., longitudinal mode) due to tight mode confinement. Thus, the non-transverse electric-field component induces non-transverse light polarization, which limits the polarization purity of counter-propagating Doppler-sensitive Raman beams, such as $\sigma^+\sigma^+$, $\sigma^-\sigma^-$, or lin-perp-lin polarization configurations, on atomic clock transitions, for example, $|F=1, m_f=0\rangle \leftrightarrow |F=2, m_f=0\rangle$ for Rb atoms. The nanofiber or waveguide modes aimed to deliver $\sigma^+\sigma^+$, $\sigma^-\sigma^-$, or lin-perp-lin Raman beams based on two independent Raman beams for counter-propagating Doppler-sensitive Raman may not be able to ideally drive the atomic clock transition due to this longitudinal mode and polarization rotation along the propaatomic coherence signal. Third, the transverse atomic motion is coupled to the internal state during the LPAI pulses, which creates the mixture of transverse trap states via transverse motional excitation. This results from the gradient of the EF-mode Raman beams (i.e., evanescently decaying fields) during the LPAI pulse sequence. Fourth, the narrow-linewidth Raman beams selectively address part of the Doppler-broadened atomic velocity class of guided atoms. Fifth, the broad-linewidth Raman beams compared to the trap frequency leads to an unresolved sideband regime. However, by choosing an optimal regime, one can mitigate these issues coming from the evanescent-field Raman beams.

Figure 4:
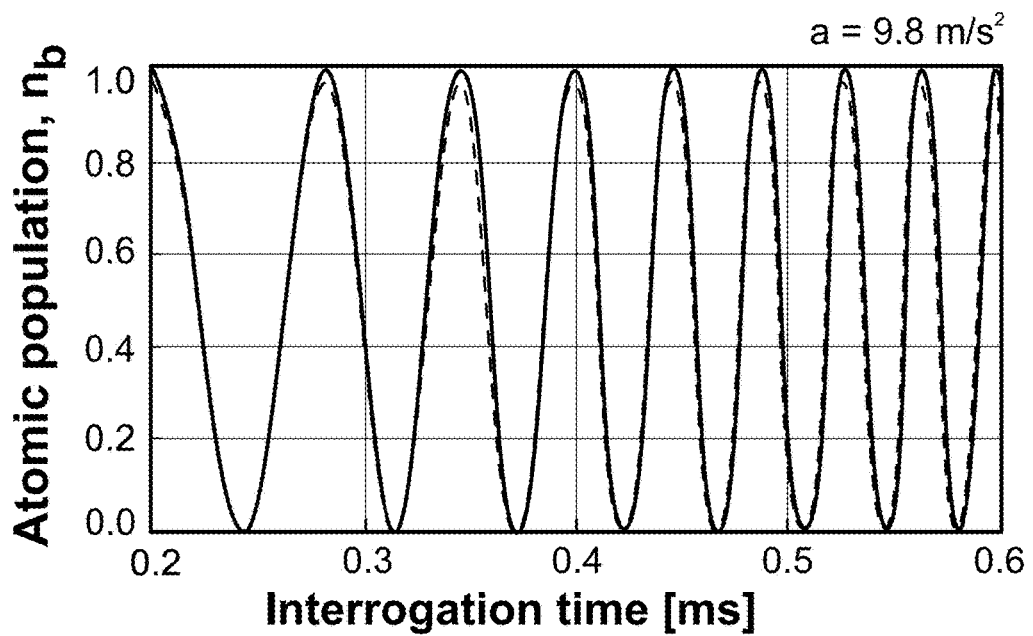
FIG. 4 illustrates the chirped atomic population signal of one of the ground states as a function of scanned interrogation time under acceleration in accordance with one or more embodiments of the present invention.

A time-scan Raman Ramsey interferometric fringe $$\left(\frac{\pi}{2} \to T_0 + \delta T \to \frac{\pi}{2}\right)$$

decays due to the decoherence mechanism. Since the EF Raman beams deliver coherent momentum kicks on the transverse trap states of optically guided atoms by using an EF mode of Raman beams, a time-scan Raman Ramsey interferometric fringe can be revived with a properly synchronized echo pulse (π-pulse), such as $$\frac{\pi}{2} \to T_0 + \delta T \to \pi \to T_0 + \delta T \to \frac{\pi}{2},$$

in accordance with one or more embodiments of the present invention. This sequence is the same as an LPAI sequence that separates, redirects, and recombines atomic wavepackets along the light guiding direction for matterwave interference to measure acceleration. Optically guided atoms in an EF ODT are subjected to an inertial force imposed on the atoms. FIG. 4 illustrates the atomic population of one of the ground states as a function of scanned interrogation time, i.e., $T_0+\delta T$, for an acceleration of 9.8 m/s². The time-scanning factor $\delta T$ may, for example, have a value of ±10% $T_0$, ±25% $T_0$, or ±50% $T_0$ in various embodiments. To capture the global interferometric signature accurately, the number of multiple interrogation times and the separation between the multiple interrogation times can be optimized according to an initial estimate with a look-up table (prepared by an EF-guided LPAI model or experimentally) or a conventional IMU co-sensor. The overall time-scanning sequence uses a plurality of values of $\delta T$, for example, three to twenty (or more) different values for the time-scanning factor $\delta T$. Stated differently, a series of N measurement sequences are employed, each with a respective time-scanning factor $\delta T$, while each respective time-scanning factor $\delta T$ falls within a range of ±10% $T_0$, ±25% $T_0$, or ±50% $T_0$, depending upon the embodiment. As a specific example, and not by way of limitation, one could set N=5, i.e., five measurement sequences, in which the time-scanning factor $\delta T$=−0.1 $T_0$, −0.05 $T_0$, 0, 0.05 $T_0$, and 0.1 $T_0$.

Figure 5:
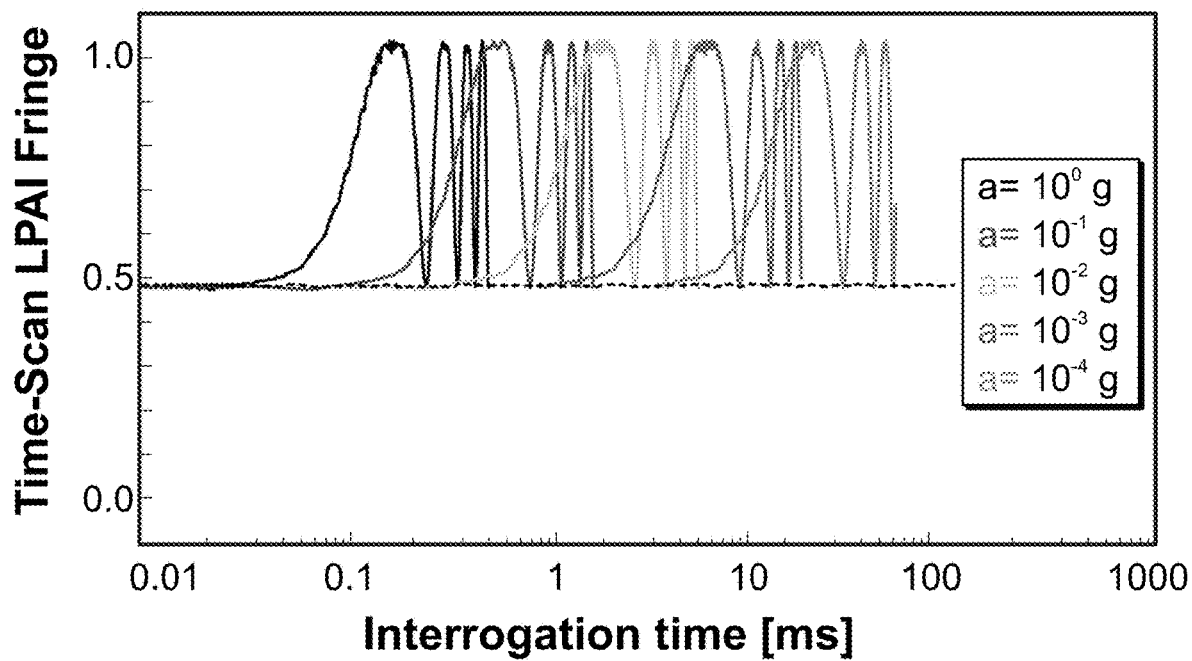
FIG. 5 illustrates the global interferometric signature, resulting from atomic fringe visibilities at multiple interrogation times, over a range of given accelerations that can be accessed using a method in accordance with one or more embodiments of the present invention.

In contrast to conventional free-space LPAI acceleration sensing, the revival of Raman coherence in an EF ODT, in accordance with one or more embodiments of the present invention, makes the contrast of an LPAI fringe recoverable at a specific interrogation time related to a transverse trap frequency. Surprisingly the interrogation time required is also dependent on the acceleration, and this method can be performed with a guided atom interferometer accelerometer. As illustrated in FIGS. 3A and 5, an acceleration sensing method may use the time-scan LPAI fringe, though the LPAI fringe still vanishes with sufficiently long interrogation times for the accelerating atom. This vanishing of LPAI fringe indicates an acceleration as illustrated in FIG. 3B. FIG. 5 illustrates the range of accelerations that can be accessed without a sophisticated feedforward algorithm and its near-real-time hardware overhead, e.g., from 1 g down to as little as 100 μg. The net result is that the EF ODT configuration provides a significantly wider dynamic range than what can be achieved using a conventional free-space LPAI configuration.

Figure 6A:
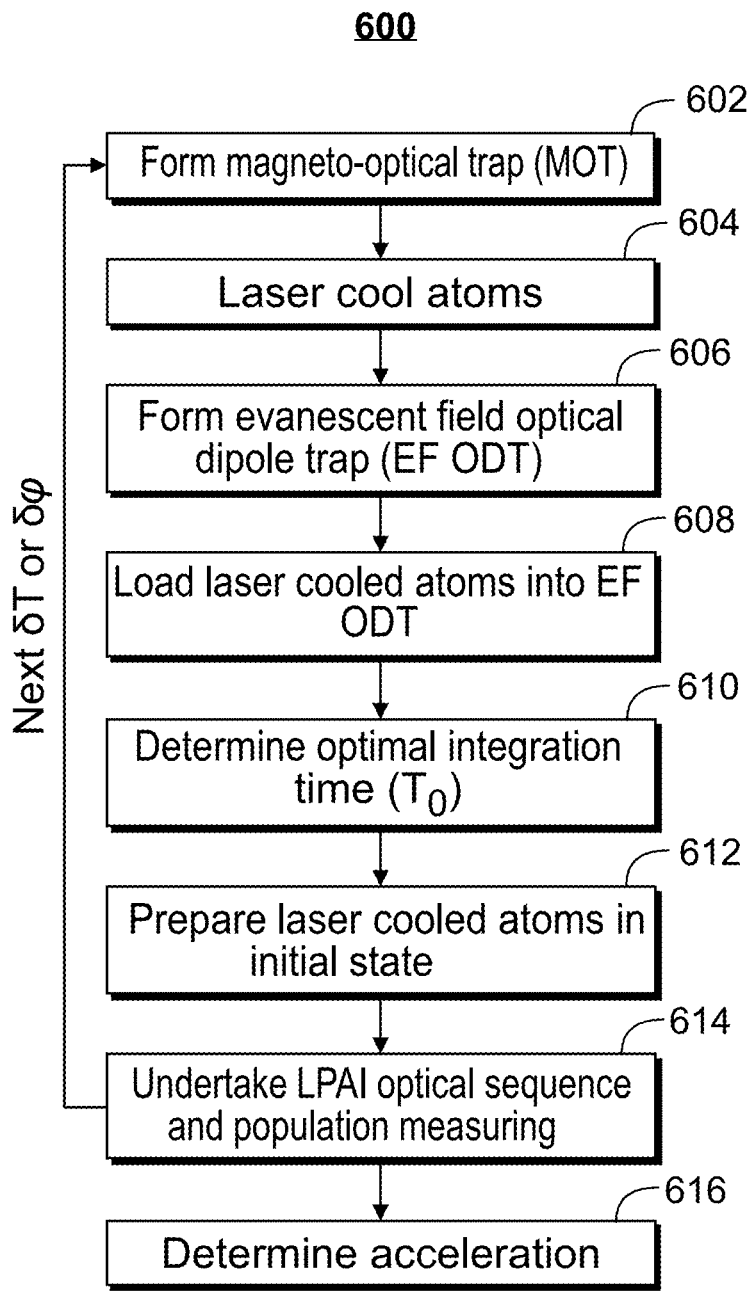

FIG. 6A is a flowchart illustrating an interrogation time-scan sensing method 600 in accordance with at least one embodiment. In step 602, a magneto-optical trap (MOT) is formed about a suspended waveguide. This corresponds to process (1) (and process (7)) in FIG. 7A. In step 604, atoms are laser cooled, for example, to a temperature of approximately 10 μK using a sub-Doppler cooling process. This corresponds to process (2) in FIG. 7A. In step 606, an EF ODT is formed about the suspended waveguide. In step 608, the laser-cooled atoms are loaded into the EF ODT. This also corresponds to process (2) in FIG. 7A. In step 610, an optimal interrogation time $T_0$ is determined for use in the LPAI optical sequence of step 614. This optimal interrogation time $T_0$ corresponds to the interrogation time necessary to find the revival of the fringe visibility. This interrogation time $T_0$ can be determined based upon a look-up table or a conventional IMU co-sensor, for example, an accelerometer. Based on an EF-guided LPAI model and co-sensor measurements, or experimental measurements taken in a laboratory, a look-up table can be prepared before capturing the global interferometric signatures, which may be employed to select the optimal integration time $T_0$ for a given acceleration. Determining $T_0$ is part of the first-step pathfinder LPAI measurement protocol noted above. In step 612, the atoms are prepared in their initial state via optical pumping. This corresponds to process (3) in FIG. 7A. In step 614, the LPAI optical sequence is undertaken to separate, redirect, and recombine the atomic wavepackets along the 1-D axial direction of the guided geometry. The guided geometry of the EF ODT reduces the transverse motion of the atoms, i.e., lateral atomic movement perpendicular to the sensing axis, thereby minimizing phase shifts from other acceleration and rotation axes. Step 614 further includes measuring the atomic state populations using fluorescence detection. Steps 602-614 are repeated to implement an interrogation time-scan measurement sequence with the interrogation time taking the form $T_0+\delta T$, with $\delta T$ taking a desired range of values when implementing the LPAI time-scan sensing method. Steps 602-614 are repeated to implement an LPAI phase-scan measurement sequence with the phase of the final π/2 optical recombination pulse taking the form $\varphi_0+\delta\varphi$, with $\delta\varphi$ taking a desired range of values when implementing the phase-scan sensing method. Step 614 corresponds to processes (4), (5), and (6) in FIG. 7A. In step 616, the output from step 614 is processed to determine an acceleration of the system.

Figure 6B:
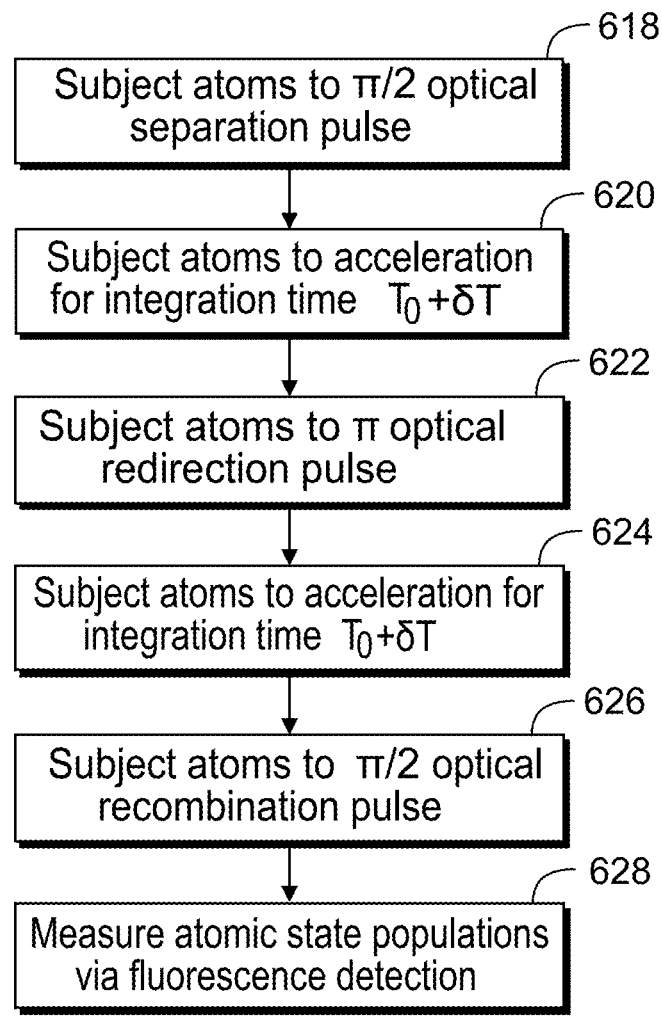
FIGS. 6B and 6C are flowcharts illustrating the sub-steps of one of the steps in FIG. 6A for time-scan and phase-scan sensing methods, respectively.

FIG. 6B is a flowchart illustrating the sub-steps of the LPAI optical sequence in step 614 when employing the LPAI time-scan sensing method. In step 618, the atoms in the EF ODT are subjected to a π/2 optical separation pulse in the form of two counter-propagating Raman beams. In step 620, the atoms are subjected to an acceleration for an interrogation time $T_0+\delta T$. In step 622, the atoms are subjected to a π optical redirection pulse, in the form of two counter-propagating Raman beams. In step 624, the atoms are again subjected to an acceleration for an interrogation time $T_0+\delta T$. In step 626, the atoms are subjected to a π/2 optical recombination pulse, again in the form of two counter-propagating Raman beams. In step 628, the atomic state populations are measured via fluorescence detection with a probe beam. Steps 618 through 626 correspond to process (4), while step 628 corresponds to processes (5) and (6).

Figure 6C:
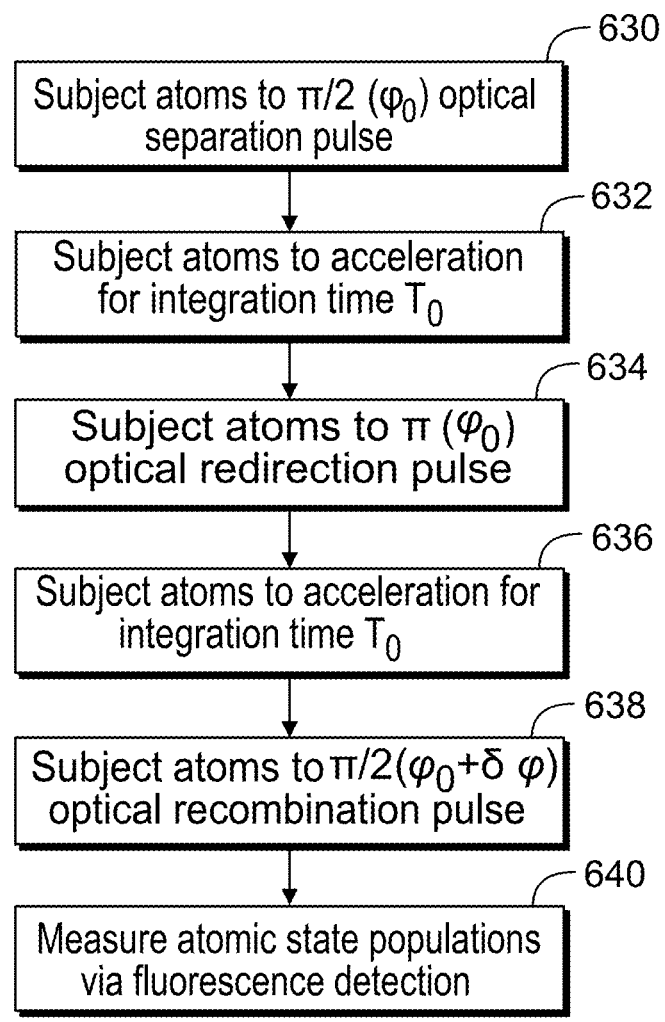

FIG. 6C is a flowchart illustrating the sub-steps of the LPAI optical sequence in step 614 when employing the LPAI phase-scan sensing method. In step 630, the atoms in the EF ODT are subjected to a π/2($\varphi_0$) optical separation pulse in the form of two counter-propagating Raman beams, with $\varphi_0$ corresponding to the phase of the microwave beat-note frequency of the two counter-propagating Raman beams. In step 632, the atoms are subjected to an acceleration for an interrogation time $T_0$. In step 634, the atoms are subjected to a π($\varphi_0$) optical redirection pulse, in the form of two counter-propagating Raman beams. In step 636, the atoms are again subjected to an acceleration for an interrogation time $T_0$. In step 638, the atoms are subjected to a π/2($\varphi_0+\delta\varphi$) optical recombination pulse, again in the form of two counter-propagating Raman beams, with δP taking on values between 0 and 2π over the course of the phase-scan sensing sequence. In step 640, the atomic state populations are measured via fluorescence detection with a probe beam. Steps 630 through 638 correspond to process (4), while step 640 corresponds to processes (5) and (6). FIGS. 6B and 6C correspond to alternative second-step high-precision LPAI measurement methods.

While FIGS. 6A-6C correspond to LPAI time-scan and phase-scan sensing methods, the steps need not be undertaken in the illustrated order. In some embodiments, various steps, or sub-steps, may be undertaken concurrently. For example, step 602 (forming the MOT), step 604 (laser cooling of the atoms), step 606 (forming the EF ODT), and step 608 (loading the laser-cooled atoms), may all be undertaken concurrently. In other embodiments, various steps, or sub-steps, may be undertaken in a different order than that illustrated in FIGS. 6A-6C. For example, step 606 (forming the EF ODT) may occur prior to step 604 (laser cooling of the atoms). In still other embodiments, various steps, or sub-steps, may be omitted. Further, while the LPAI time-scan and phase-scan sensing methods have been described separately, they may be used concurrently.

Under high cross-axis acceleration, atoms may be lost from the EF ODT. However, by using an IMU co-sensor, high cross-axis acceleration can be anticipated. In this case, one may alter forming the EF ODT (step 606) using a feedforward technique such that atoms are less likely to be lost from the EF ODT. Specifically, the EF ODT may be made "deeper," thereby better confining the atoms to the EF ODT and making it less likely that atoms may be lost due to the high cross-axis acceleration. This deeper EF ODT may be formed by increasing the optical power of the EF trapping beams (106, 108 in FIG. 1A).

Figure 7A:
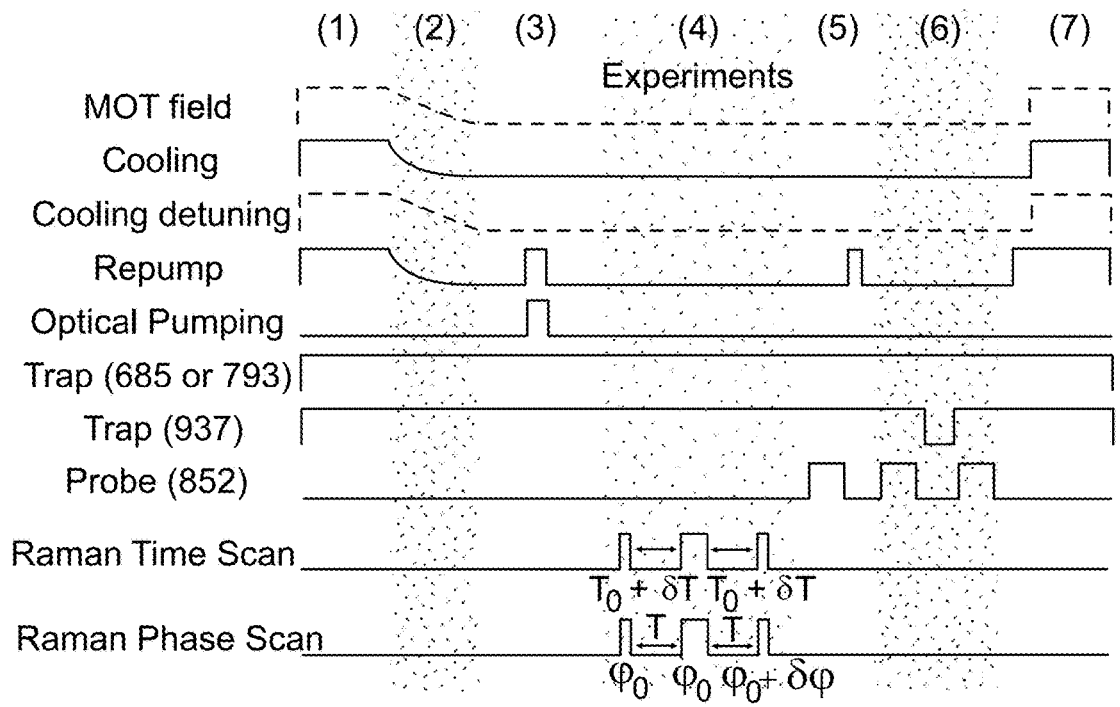

FIG. 7A illustrates a timing and detuning diagram for the various optical beams for an interrogation time-scan sensing method in accordance with at least one embodiment. A set of MOT lasers are adapted to emit cooling beams, a repump beam (based on the 852 nm D2 transition for $^{133}$Cs atoms), and an optical pumping beam (based on the 895 nm D1 transition), with the timing and detuning as shown in the top four traces of FIG. 7A. Specifically, the MOT lasers, which provide the cooling beams, also provide the optical pumping beam by changing the modulation frequency, i.e., detuning, the cooling beam to generate the optical pumping beam as illustrated in FIG. 7A. A pair of trapping lasers generate the red-detuned and the blue-detuned trapping beams, with the timing as shown in the fifth and sixth traces of FIG. 7A. A probe laser generates the probe beam with the timing as shown in the seventh trace of FIG. 7A. As will be appreciated, portions of the probe beam trace will be repeated for each interrogation time ($T_0+\delta T$) in the interrogation time-scan sensing sequence.

Processes (1) and (7) of FIG. 7A correspond to preparing the cold atoms. Process (2) corresponds to the simultaneous sub-Doppler cooling of the atoms and the loading of the atoms into the MOT. Process (3) corresponds to preparing the initial atomic state. Process (4) corresponds to the experimental step, which includes exposing the atoms to an external acceleration and employs either the time-scan (next to bottom trace showing $T_0+\delta T$ between the three Raman pulses) or the phase-scan sensing method (bottom trace showing $\varphi_0+\delta\varphi$ for the third (recombination) Raman pulse). Processes (5) and (6) correspond to detecting atomic signals.

The atomic signal detection processes (5) and (6) correspond to a multi-pulse detection method as follows. The detection beam is coupled into the nanofiber and is on resonance with the |F=4>→|F'=5> transition. The transmitted detection beam power is detected using a single photon counting module (SPCM) and the counts are recorded. First, the probe pulse is switched on for 500 µs to detect the atoms in the state |F=4>. Second, a repump pulse is used to transfer all atoms in the lower ground state |F=3> into |F=4> and is on for 100 µs. These two pulses correspond to process (5). In process (6), a probe pulse is used to detect all atoms in the atomic trap and is switched on for 500 µs. Finally, a long 10 ms interval is used before the last probe pulse. During this interval, the red-detuned trap beam is switched off to release all atoms from the atomic trap. The final 500 µs long probe pulse is then measured and is used as a reference. This method allows for normalized detection, which cancels out the noise during the detection process. To analyze the data, one assumes that the number of atoms in the atomic trap remains constant. The counts detected for the three probe pulses are represented by $C_1$, $c_2$, and $c_3$, respectively. The transmission during the first probe pulse (process (5)) is $T_1=c_1/c_3$ and during the second probe pulse (process (6)) $T_2=c_2/c_3$. The number of atoms in |F=4> is proportional to the absorption $A_1=1-T_1$ during the first probe pulse and the total number of atoms is proportional to the absorption during the second probe pulse $A_2=1-T_2$. Finally, the probability of the atoms being in |F=4> can be represent by $P_4=(c_3-c_1)/(c_3-c_2)$.

Figure 7B:
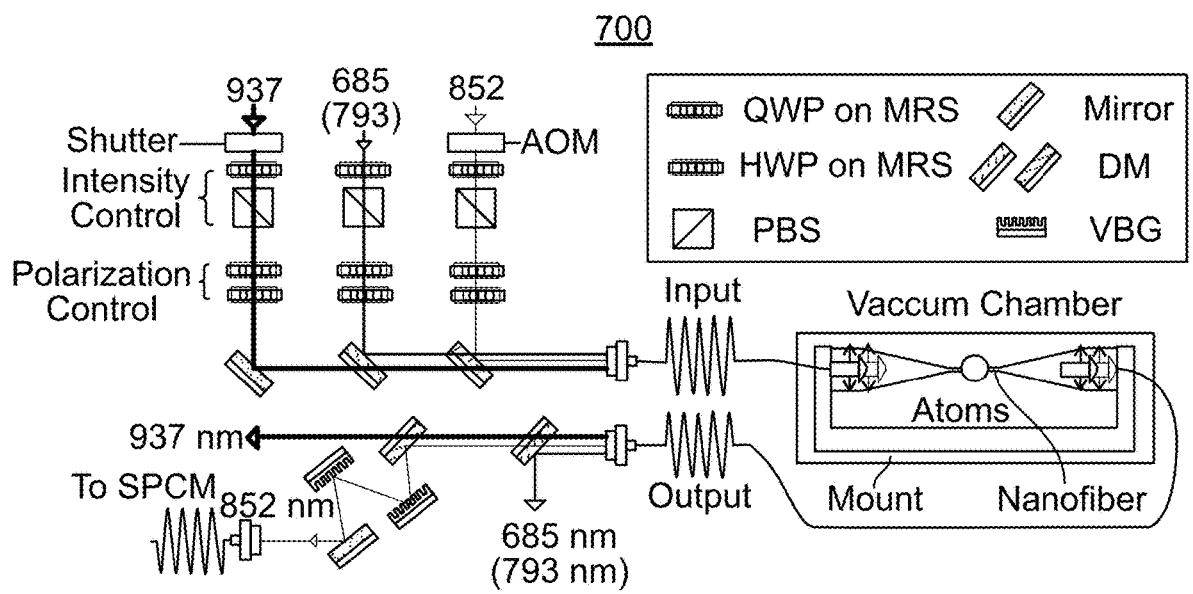
FIG. 7B illustrates a corresponding EF-mode guided LPAI sensing system with a nanofiber platform in accordance with one or more embodiments of the present invention.

FIG. 7B illustrates an interrogation time-scan sensing system 700 in accordance with at least one embodiment, and may be employed with the timing and detuning diagram of FIG. 7A. The sensing system 700 includes an optical portion that includes two trap beams at 937 nm and 685 nm (or 793 nm), as well as a probe beam at 852 nm, all of which are combined to form an input optical signal. Note that these wavelengths are for a sensing system 700 employing $^{133}$Cs atoms. As other embodiments may employ other atoms, their wavelengths will differ accordingly. The input optical signal is coupled to and enters a vacuum chamber that contains the atoms. The output optical signal is then separated based upon wavelength, with the probe beam being directed to a detector, for example, a single photon counting module. The various elements of the sensing system 700 include various quarter wave plates (QWPs), half wave plates (HWPs), polarizing beam splitters (PBSs), mirrors, dichroic mirrors (DMs), and volume Bragg gratings (VBGs). Several of the QWPs and HWPs are mounted on motorized rotation stages (MRSs) to permit intensity or polarization control. Note that various beams may be further controlled through the use of a shutter or an acousto-optic modulator (AOM). As will be appreciated by one of skill in the art, there are numerous other ways of implementing the sensing system 700.

Figure 8:
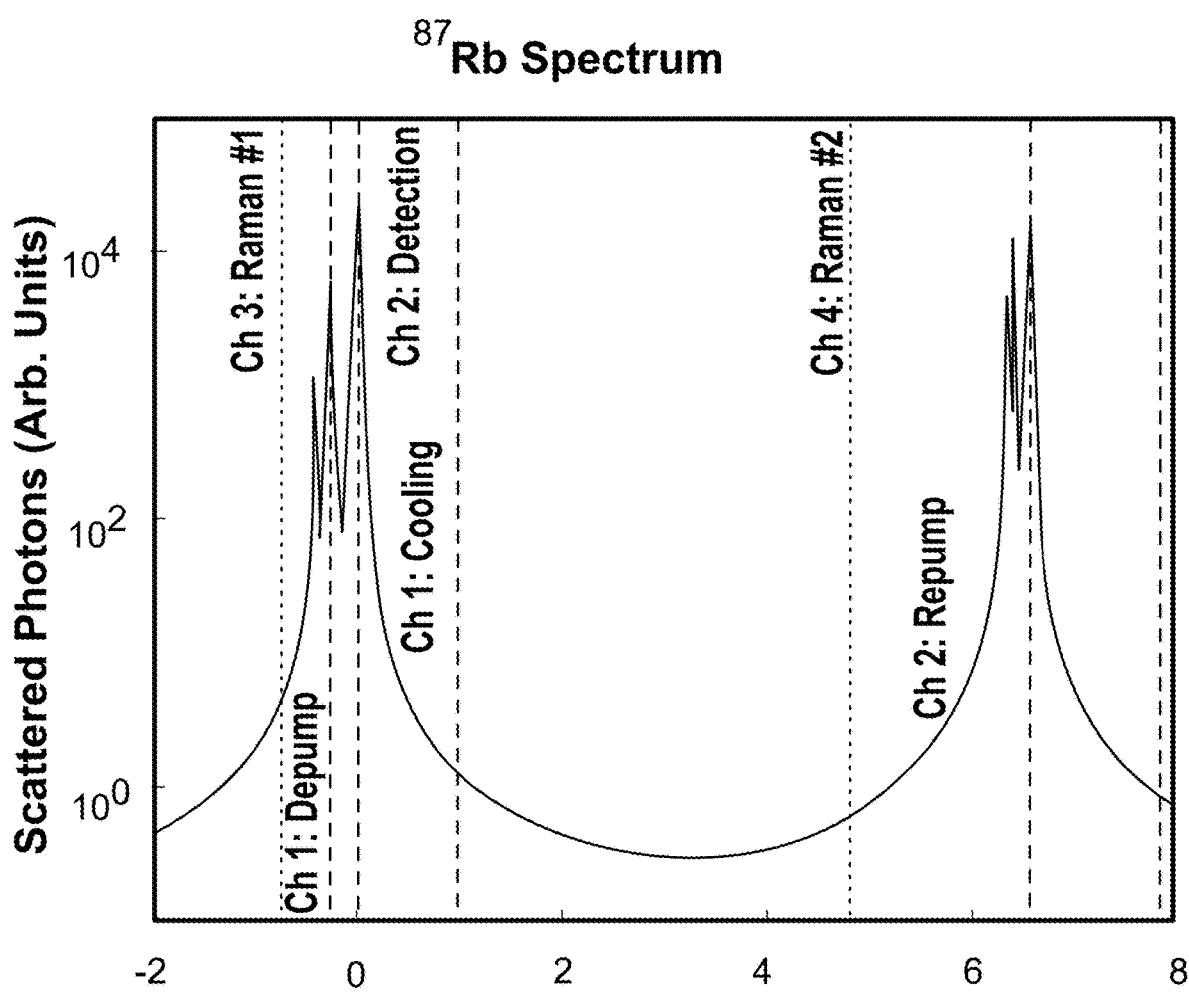
FIG. 8 illustrates the relative detuning of the various optical signals for an LPAI time-/phase-scan sensing method in accordance with one or more embodiments of the present invention.

FIG. 8 illustrates the relative detuning of the various optical signals when the atomic cloud is formed of $^{87}$Rb, though in other embodiments, other suitable atomic species may be used to form the atomic cloud, for example, $^{133}$Cs. U.S. Pat. No. 11,545,815, entitled "Compact Laser Source with Frequency Modulators Generating Multiple Lines," and assigned to the same assignee as this application, describes the timing and generation of the different optical signals illustrated in FIGS. 7 and 8. As will be appreciated by one of skill in the art, the relevant wavelengths are a function of the atomic species being used. Further, implementing a sensor system with a photonic integrated circuit laser system developed for one atomic species may be reusable for other atomic species. For example, while integrated silicon photonics (1560 nm) may be employed with frequency-doubling nonlinear photonics when using 87Rb (780 nm), the wavelengths required for $^{133}$Cs (852 nm) can be generated with frequency-sum nonlinear photonics (from 1560 nm to 852 nm), which may be used to implement a $^{133}$Cs sensor system with silicon photonics and nonlinear photonics.

Figure 9:
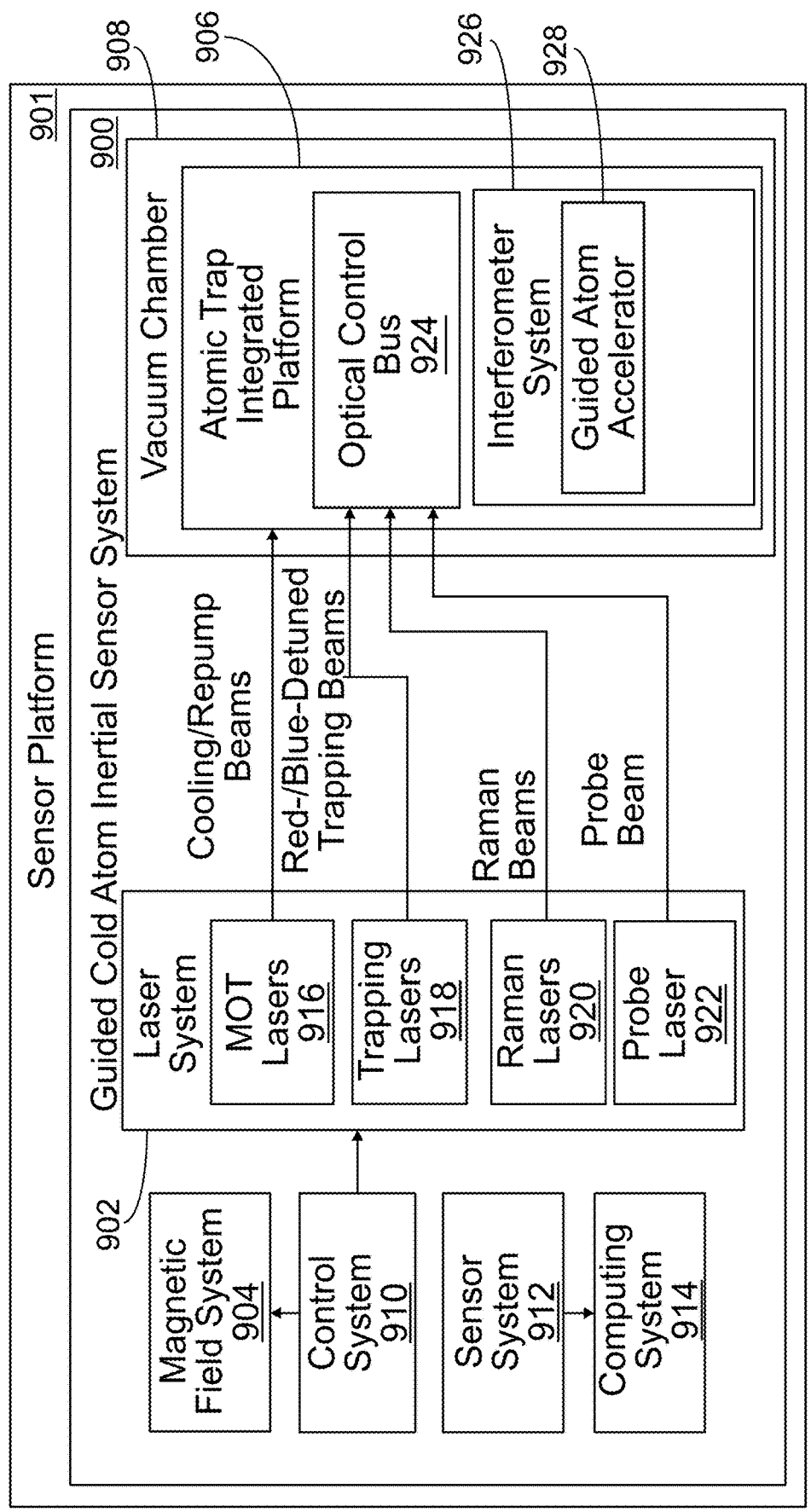
FIG. 9 illustrates an exemplary guided cold atom inertial sensor system that may be used to implement an LPAI time-/phase-scan sensing method in accordance with one or more embodiments of the present invention.

FIG. 9 illustrates an exemplary guided cold atom inertial sensor system 900 that may be employed to implement an interrogation time-scan sensing method in accordance with one or more embodiments. The system 900 facilitates determining acceleration of a sensor platform 901 based upon the atom interference of guided atoms in the EF ODT along the path of the waveguide is illustrated. The system 900 is adapted to trap and cool neutral atoms in a MOT formed near the surface of a waveguide and to further load the atoms into an EF ODT that is formed directly above the waveguide. Once the atoms are trapped in the EF ODT, the system 900 can impart momentum to the atoms using light-pulse sequences for atom interferometry operation, and in particular, an interrogation time-scan sensing method in accordance with one or more embodiments. The system 900 then detects atomic populations to measure the atom interference fringe and thereby determines acceleration of the sensor platform 901.

The system 900 can be included on the platform 901. The platform 901 can be, for example, an aircraft, a spacecraft, a ship, a submarine, a missile, or other vehicle. The system 900 includes a laser system 902, a magnetic field system 904, an EF ODT structure 906, and a vacuum chamber 908 within which the EF ODT structure 906 is disposed. In the vacuum chamber 908, an atom source, for example, an alkali metal dispenser, generates a population of neutral atoms suitable for a MOT. The system 900 can further include a control system 910 that is adapted to control operations of the laser system 902 and the magnetic field system 904 (e.g., by way of control signals output by the control system 910 to the laser system and the magnetic field system 904). Still further, the system 900 can include a sensor system 912 and a computing system 914. Some of the sensor systems 912 can output sensor data indicative of a quantity of interest, such as atomic fluorescence light related to cold atoms in a MOT or waveguide-coupled absorption probe light related to guided atoms in the EF ODT in the vacuum chamber 908. The computing system 914 can be adapted to receive the sensor data from the sensor system 912. The computing system 914 can be adapted to compute, based upon the sensor data, an acceleration of the platform 901 along or about one or more axes. In some embodiments, the sensor system 912 may include, for example, a co-sensor in the form of a conventional inertial measurement unit (IMU), that provides information about the motion of the sensor platform 901 to a computing system 914. In other embodiments, the sensor system 912 may include a look-up table prepared from an EF-mode guided LPAI model or from experimental data. The computing system 914 then uses the information from the co-sensor or look-up table to, for example, determine the optimal interrogation time $T_O$ under dynamic environments.

The laser system 902 and magnetic field system 904 are adapted to create a MOT in a vicinity of the EF ODT structure 906 (e.g., intersecting with the EF ODT structure 906). The laser system 902 can further establish an evanescent-field mode guided through a suspended waveguide of a guided atom accelerometer 928 that is a part of the system 900. The red-detuned and blue-detuned evanescent-field modes guided through the waveguide establish an EF ODT. After loading cold atoms from a MOT to the waveguide, the EF ODT can trap atoms nearby the surface of the waveguide. Once atoms are loaded into the EF ODT and trapped proximally to the EF ODT structure 906 (e.g., closer to the EF ODT structure 906 than atoms initially trapped in the MOT), the laser system 902 can be further adapted to coherently control the atomic states, provide momentum to guided atoms for atom interference, probe the atomic population from atomic absorption or atomic fluorescence, and attain the information about acceleration from atom interferometric fringes.

The laser system 902 comprises MOT lasers (cooling/repump) 916, trapping lasers 918, Raman lasers 920, and a probe laser 922. The EF ODT structure 906 comprises an optical control bus 924 and an interferometer system 926, which comprises a guided atom accelerometer 928. The optical control bus 924 is adapted to selectively couple various optical signals into various components of the interferometer system 926 (e.g., the guided atom accelerometer 928). While the interferometer system 926 is shown as including a single guided atom accelerometer 928, it is to be understood that the interferometer system 926 can include multiple accelerometers in order to detect motion of the platform 901 along multiple spatial axes. For example, the interferometer system 926 can include three accelerometers, each adapted to sense motion of the platform 901 along one of three orthogonal axes (x, y, and z spatial dimensions).

The EF ODT structure 906 is an integrated photonics device that is adapted to facilitate trapping atoms by an evanescent field in close proximity to a surface of a suspended waveguide included in the accelerometer 928 (e.g., within 200 nanometers of the surface of the suspended waveguide). The EF ODT structure 906 can be further adapted to facilitate guided atoms in the EF ODT based upon optical signals coupled into the suspended waveguide of the accelerometer 928. As will be described in greater detail below, the suspended waveguide of the accelerometer 928 is suspended over a region of empty space within the vacuum chamber 908 to facilitate loading of atoms into an EF ODT in the vicinity of the surfaces of the waveguide.

The MOT lasers 916 are adapted to emit cooling beams, repump beam, and a depump beam (e.g., an optical pumping beam for initial atomic state preparation) into the vacuum chamber 908 to illuminate the EF ODT structure 906 or a region of space that is proximal to the EF ODT structure 906 within the vacuum chamber 908. A magnetic field system 904 with anti-Helmholtz coils establishes a quadrupole magnetic field (not shown). Collectively, the cooling beams emitted by the MOT lasers 916 and the magnetic field gradient established by the magnetic field system 904 establish a MOT that locates laser-cooled atoms at the magnetic field zero point in a region that is proximal to the EF ODT structure 906 within the vacuum chamber 908. The MOT lasers 916 are configured such that the cooling beams intersect within the regional proximal to the EF ODT structure 906 and nearby a surface of the EF ODT structure 906 (e.g., within a distance of approximately 500 micrometers or less of a surface of the EF ODT structure 906). Intersection of the cooling beams within the magnetic field gradient established by the magnetic field system 904 establishes the MOT with an additional repump beam (e.g., emitted by a laser among the MOT lasers 916). The MOT is centered about an intersection of the cooling beams and confines a population of atoms within a region that is proximal to the EF ODT structure 906 (e.g., within the region within which the magnetic field gradient is established). The magnetic field gradient established by the magnetic field system 904 and an intersection region of the cooling beams can both be overlapping with the waveguide included in the EF ODT structure 906, such that the MOT intersects or overlaps with the waveguide. In other words, the MOT causes a dense population of cooled atoms to be distributed about the waveguide.

Figure 10A:
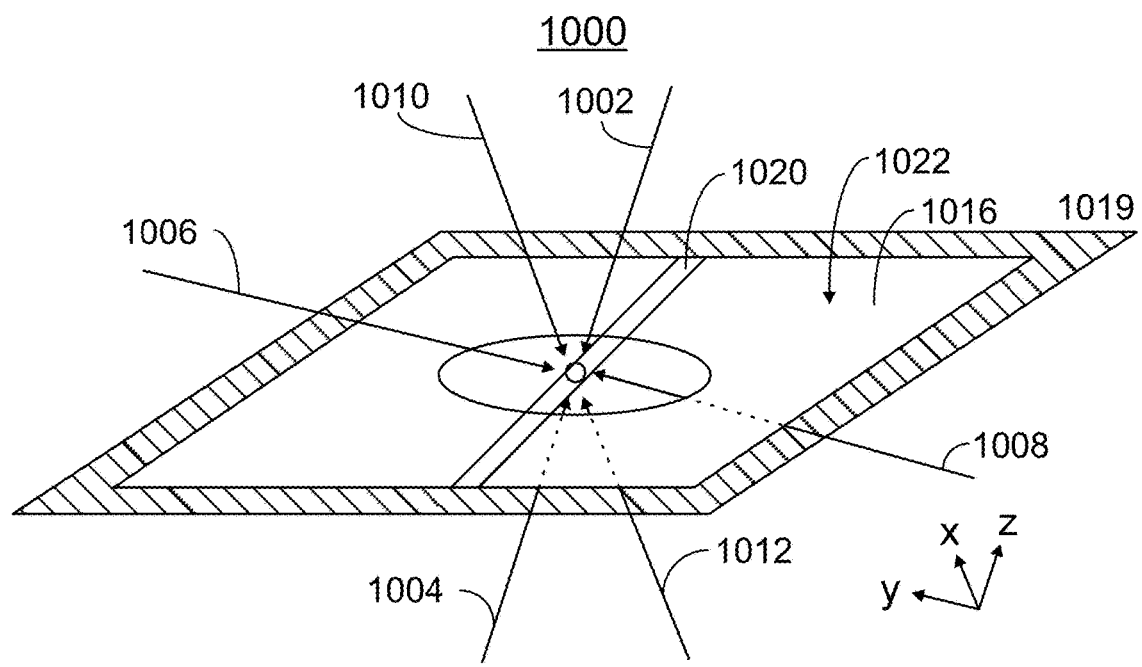
FIGS. 10A and 10B illustrate an exemplary EF ODT structure that may be used to implement one or more embodiments of the present invention.
Figure 10B:
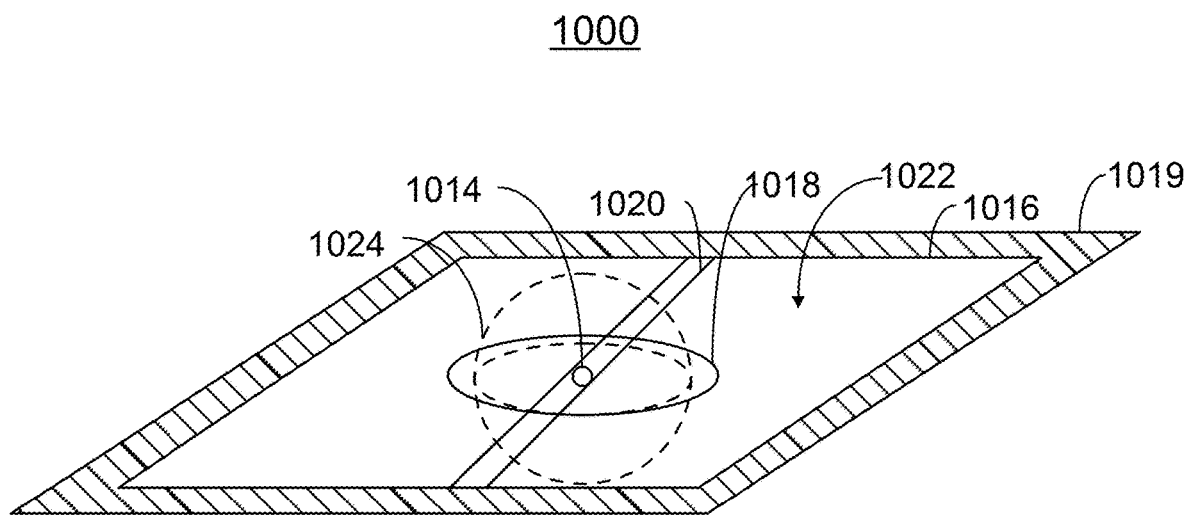

By way of example, and with reference now to FIGS. 10A and 10B, an exemplary EF ODT structure 1000 is shown. FIG. 10A depicts the EF ODT structure 1000 and a plurality of six cooling beams 1002-1012 that intersect in a region 1014 that is proximal to a surface of the EF ODT structure 1000. The exemplary EF ODT structure 1000 includes a membrane 1016 having an aperture 1018 formed therein, and a substrate 1019 that supports the membrane 1016. The EF ODT structure 1000 further includes a waveguide 1020 that is disposed on the membrane 1016 and across the aperture 1018, such that the waveguide 1020 is suspended over the aperture 1018. The substrate 1019 supports the membrane 1016 around a periphery of the membrane 1016, such that the EF ODT structure 1000 includes an interior portion 1022 in which the substrate 1019 is not present underneath the membrane 1016. In other words, the substrate 1019 has an opening formed therein over which the membrane 1016 extends, and the membrane 1016 has the aperture 1018 formed therein, over which the waveguide 1020 extends. As will be described in greater detail below, however, in at least some embodiments a waveguide can extend proximally to one or more apertures, or between two apertures in a membrane. The aperture 1018 can be a substantially circular aperture, with the waveguide 1020 extending across the aperture 1018 and bisecting the aperture 1018. In various embodiments, and as described in greater detail below, the aperture 1018 can be formed by etching of the membrane 1016, backside etching of the substrate 1019, and releasing the membrane 1016 from the substrate 1019. Thus, since the waveguide 1020 is formed on the membrane 1016, the aperture 1018, when viewed from underneath, can be seen as two opposing circular segments, with a layer of membrane material extending along the length of the waveguide 1020 and contiguous with the remainder of the membrane 1016.

The region 1014 of intersection of the cooling beams 1002-1012 is disposed within or above the aperture 1018. The cooling beams 1002-1012 are arranged in three orthogonal pairs of counter-propagating beams. Stated differently, the beams 1002, 1004 form a first pair of beams that propagate in opposite directions, which directions are orthogonal to the directions of propagation of the remaining beams 1006-1012. Similarly, beams 1006, 1008 are a second pair of beams propagating in opposite directions, which directions are orthogonal to the directions of propagation of beams 1002, 1004, 1010, 1012. Finally, beams 1010, 1012 are a third pair of beams propagating in opposite directions, which directions are orthogonal to the directions of propagation of beams 1002-1008. Each of the pairs of beams can propagate along one of an x-, y-, or z-axis shown in FIG. 10A.

Thermal management within the EF ODT structure 906 is important due to high optical loss and absorption in waveguides as compared with optical nanofibers, and the inability to conduct heat away from the EF ODT structure 906 by convection due to the need for ultra-high vacuum conditions to form the MOT. In various embodiments, and referring again to FIG. 10, the substrate 1019 is formed from silicon. Silicon has improved thermal conductivity as compared to, for example, silicon dioxide, and facilitates the transfer of heat away from the waveguide 1020.

When composed of silicon, the substrate 1019 is substantially opaque with respect to wavelengths of the cooling beams 1002-1012. The membrane 1016 is adapted to be substantially transparent to the cooling beams 1002-1012. For example, the membrane 1016 can be thin (e.g., approximately equal to 75 nanometers thick or less) and composed of a material that is substantially transparent to wavelengths of the cooling beams 1002-1012 for certain atomic species. In exemplary embodiments, the membrane 1016 can be composed of any transparent materials, such as aluminum oxide ($Al_2O_3$), silicon nitride ($Si_3N_4$), aluminum nitride (AlN), etc. The membrane 1016 can be constructed so that the membrane 1016 has a transmittance of approximately 90% or greater with respect to wavelengths of the cooling beams 1002-1012. The transmittance also depends on the light polarization (e.g., s- or p-polarized light) and incident angle.

Figure 11A:
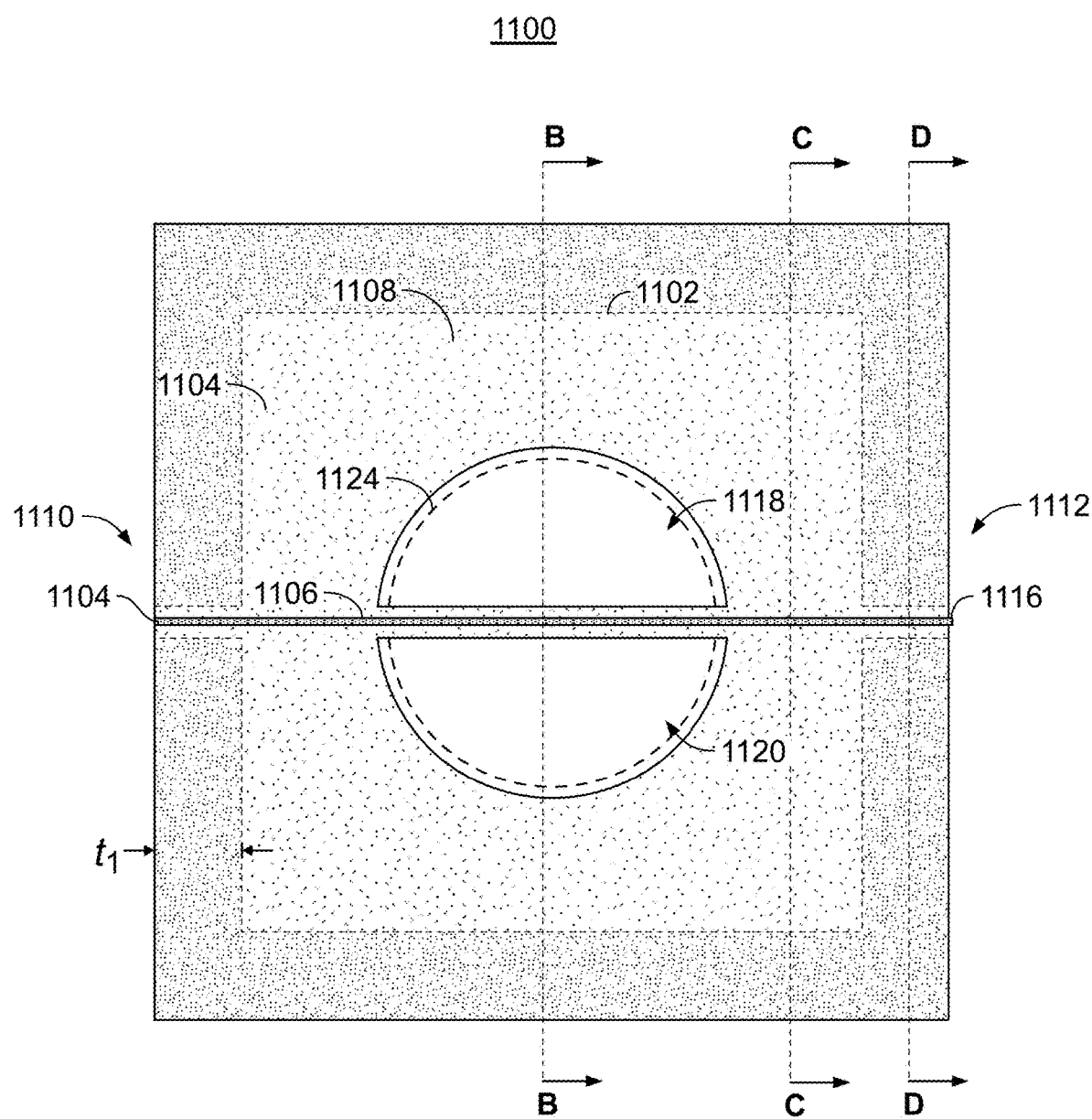
FIGS. 11A-11D illustrate an exemplary EF ODT structure that may be used to implement one or more embodiments of the present invention.
Figure 11B:
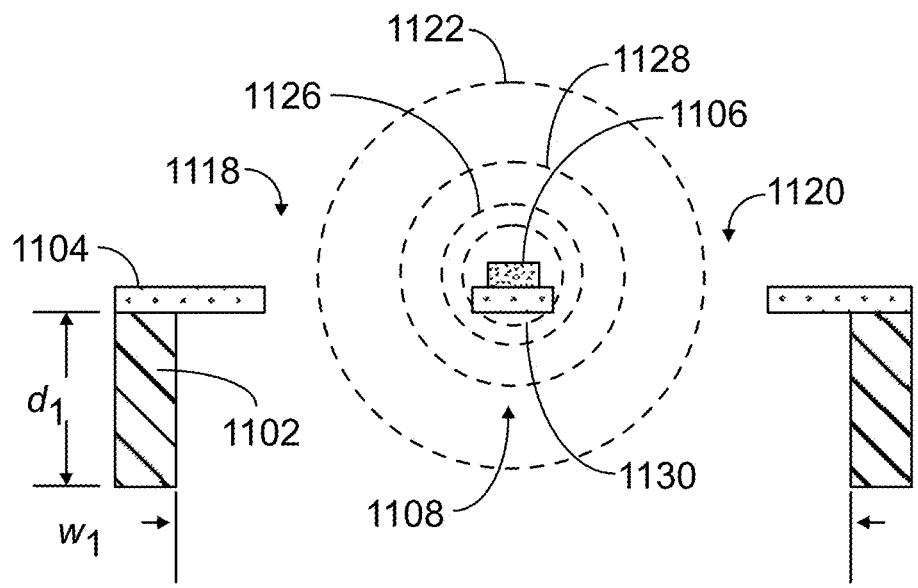
Figure 11C:
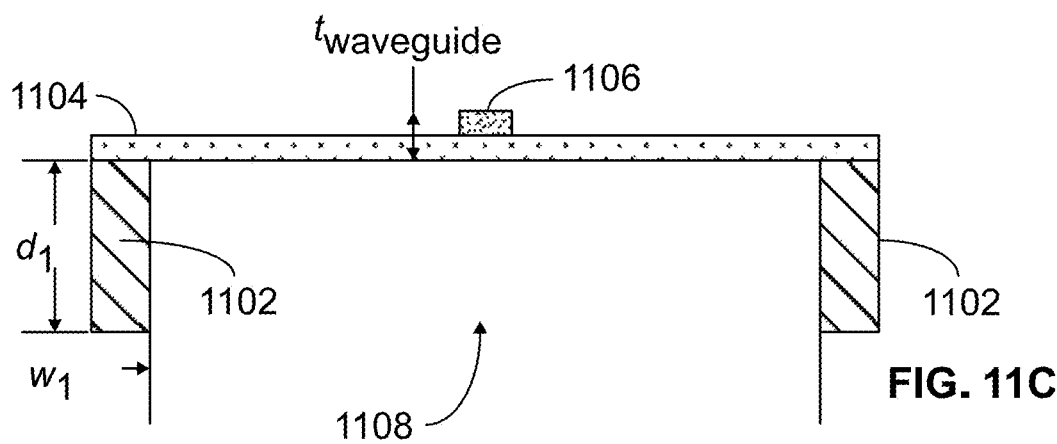

In exemplary embodiments, the height (or thickness) of the waveguide 1020, (see, e.g., the thickness $t_{waveguide}$ of waveguide 1106 shown in FIG. 11C), which can be, for example, a membrane ridge waveguide, can be less than or equal to approximately 150 nanometers, which is designed for optimal EF ODTs with red-detuned and blue-detuned trapping beams and is independent of the optimal membrane thickness for high transmittance. This thin waveguide 1020 results in an optical mode that is weakly confined to the material of the waveguide 1020. This provides lower optical absorption relative to some other waveguide geometries, reducing the heat generated within the waveguide 1020.

In some embodiments, a high refractive index waveguide core, e.g., silicon nitride (n=2.05), may be deposited and patterned as a waveguide above a low refractive index membrane, e.g., aluminum oxide (n=1.76). This silicon nitride/aluminum oxide structure can be used as the suspended waveguide of an EF ODT structure. In various embodiments, another low refractive index membrane, e.g., aluminum oxide (n=1.76), covers the high refractive-index waveguide core to protect the high refractive-index waveguide core from degradation by alkali atoms. In some embodiments, a high refractive index waveguide core, e.g., silicon nitride (n=2.05), above a low refractive index membrane, e.g., aluminum oxide (n=1.76), is surrounded by the top and bottom, sandwiched low refractive-index cladding layers, e.g., silicon dioxide (n=1.47), at input and output light coupling regions, rather than the waveguide with the top open space and the bottom void in the substrate, which allows reliable optical packaging by way of fiber-to-waveguide butt coupling techniques. The thickness of a top or bottom cladding layer can be three to five micrometers according to the mode area of the coupling light.

When a suitable magnetic field is established within the region 1014 at the same time that the cooling beams 1002-1012 intersect in the region 1014, the interaction of the magnetic field and the cooling beams 1002-1012 create a MOT. The MOT is a region of space within which atoms (e.g., atoms that are present in the space about the EF ODT structure 1000) are trapped and cooled. Referring now to FIG. 10B, the EF ODT structure 1000 is shown with the MOT depicted as a sphere 1024 centered about the region of intersection 1014 of the cooling beams 1002-1012. It is to be understood that while depicted as a sphere for simplicity, atoms in the MOT 1024 can be present in a region that has a different shape or an irregular shape. Furthermore, atoms in the MOT 1024 remain in motion and are distributed in a cloud within the MOT 1024. Thus, a shape of the cloud of atoms in the MOT 1024 changes over time. Further, a position of the MOT 1024 can refer to a time-averaged position of a center of mass of the atoms trapped in the MOT 1024.

Referring to FIG. 9, the near-surface formation of cold atoms with a MOT can be established by the MOT lasers 916, but the near-surface formation of cold atoms is limited within a distance of approximately 500 micrometers or less from the surface of the EF ODT structure 906 (e.g., a surface of the membrane 1016). A signal-to-noise ratio of a sensor (e.g., the guided cold atom inertial sensor system 900) based upon measurement of neutral atoms trapped by the EF ODT structure 906 can be improved by increasing a number of atoms that can be trapped and guided by the EF ODT structure 906. However, the number of atoms trapped by a coarse free-space MOT generally decreases as a diameter of the cooling beams used to form the MOT is decreased. Accordingly, a device based solely on a coarse free-space MOT can have size, weight, and power (SWaP) that are limited by the diameter of cooling beams required to achieve a desired number of trapped atoms.

Referring to FIG. 9, the trapping lasers 918 are adapted to control the EF ODT structure 906 (e.g., the guided atom accelerometer 928) such that an EF ODT is formed within a distance of about 200 nanometers of a waveguide surface of the EF ODT structure 906. The EF ODT is formed by two evanescent fields (e.g., one red-detuned, one blue-detuned) propagating along the suspended waveguide of the guided atom accelerometer 928. The trapping lasers 918 are optically coupled to the waveguide such that light emitted by at least some of the trapping lasers 918 propagates through the waveguide. The trapping lasers 918 can be optically coupled to the waveguide by way of any of various optical and integrated photonics components. By way of example, and not limitation, the trapping lasers 918 can be optically coupled to the waveguide by any or a combination of reflectors, beam splitters, optical couplers, optical fibers, optical waveguides, etc. (e.g., included in the optical control bus 924).

The trapping lasers 918 are adapted to emit trapping beams that are red-detuned and blue-detuned with respect to an optical resonant transition frequency of atoms that are desirably loaded into the EF ODT formed at the EF ODT structure 906. By way of example, and not limitation, for embodiments wherein the EF ODT structure 906 is adapted to trap cesium atoms, the red-detuned trapping beam can have a wavelength of approximately 937 nanometers (e.g., 937 nanometers±5 nanometers), and the blue-detuned trapping beam can have a wavelength of approximately 793 nanometers (e.g., 793 nanometers±5 nanometers). The red-detuned and blue-detuned trapping beams are coupled to a waveguide such that the trapping beams travel through the waveguide.

As it travels through the waveguide, the red-detuned trapping beam establishes an attractive evanescent field potential about the waveguide. The attractive evanescent field potential can extend into a region of space that includes the MOT. The attractive evanescent field potential causes atoms trapped in the MOT to be drawn closer to a surface of the waveguide. Simultaneously, as the blue-detuned trapping beam travels through the waveguide, the blue-detuned trapping beam establishes a repulsive evanescent field potential about the waveguide. The repulsive evanescent field tends to repel atoms from the surface of the waveguide for compensating near-surface attractive potential, such as the van der Waals potential.

The interaction of the attractive and repulsive evanescent fields about the waveguide tends to create a potential minimum in the vicinity of a surface of the waveguide. The interaction of an atom with the evanescent electric fields induces a spatially varying light shift, $\Delta E \approx -\hbar \Omega^2(r)/4\Delta$, where $\hbar$ is the reduced Planck's constant, $\Delta$ is the detuning from resonance, and $\Omega(r)$ is the position dependent Rabi frequency. The resulting dipole force acting on the atoms is the derivative of this potential, $$F_{dip} = -\frac{\partial(\Delta E)}{\partial r}$$

and can be used to trap the atoms. Here, r is the distance from the surface of the waveguide. If the wavelength is detuned 'red' from the atomic resonance ($\Delta<0$) this force is attractive and if detuned 'blue' from resonance ($\Delta>0$) the force is repulsive. In both cases the force is strongest in regions of high intensity gradient of the evanescent fields. Hence, combining with the van der Waals potential, propagation of the red-detuned trapping beam and the blue-detuned trapping beam through the waveguide creates a potential well with a minimum several hundred nanometers from the waveguide surface. Atoms in the MOT are attracted to the waveguide by the attractive evanescent field potential but are prevented from striking the waveguide by the repulsive evanescent field potential. The interaction of the attractive and repulsive evanescent field potentials about the waveguide causes an EF ODT to be established proximal to a surface of the waveguide. For example, the EF ODT can be established within a distance of approximately 100 nanometers or less of the surface of the waveguide.

The EF ODT established by the red-detuned and blue-detuned trapping beams traveling through the waveguide allows neutral atoms to be guided along the EF ODT in closer proximity to a surface of the waveguide. For sufficient atom loading into the EF ODT, it is necessary to realize near-surface formation of cold atoms, which is limited within a distance of about 100 micrometers from the surface of the EF ODT structure 906 (e.g., the surface of the membrane 1016). For instance, while atoms in the MOT can be held in a cloud that is, on average, centered in proximity to the waveguide, the number of atoms in the steady-state MOT decreases due to atomic collisions with the waveguide or membrane surface or atomic adsorption to the waveguide or membrane surface. Furthermore, the initial number of atoms in the steady-state MOT depends on the beam diameter and intensity of the cooling beams. Thus, when the cooling beams are shadowed by a needle structure (described below with reference to FIG. 13) or a partially-opaque membrane surface, the number of atoms in the MOT may be limited.

By holding atoms in close proximity to the waveguide, the EF ODT with red-detuned and blue-detuned traveling-wave trapping beams allows the EF ODT structure 906 to be used for cold atom position, navigation, and timing (PNT) sensors (e.g., the sensor system 900). Using the EF ODT structure 906, guided atom interferometer accelerometers can be demonstrated, which require fine control of internal atomic state, momentum kicks to construct atom interferometry, and measurement of atom interference fringes. For example, Raman beams (e.g., emitted by the Raman lasers 920) control internal atomic state and provide momentum kicks to perform atom interferometry, which is coupled into the waveguide or is driven to the guided atoms through free space. The probing beam that is emitted by the probe laser 922 and coupled into the waveguide can be used to measure atom interference fringes from guided atoms in the EF ODT.

Doppler-sensitive Raman beams are composed of two counter-propagating beams with a proper configuration of light polarizations (σ⁺σ⁺, σ⁻σ⁻, lin-perp-lin), which is based on a stimulated Raman transition that causes the atoms to absorb a photon from one beam and emit a photon into another beam moving in the opposite direction. The quantization axis is aligned along the Raman beams. Therefore, the net momentum kicks of two photons, i.e., the photon recoils, are delivered to the atoms in the light-pulse sequence of atom interferometry, and the atom changes both its kinetic energy and internal state. The three light pulses ($\pi/2 \rightarrow \pi \rightarrow \pi/2$) coupled to the waveguide can create the state-dependent momentum kicks on two hyperfine ground states of atoms to split, redirect, and recombine atomic wavepackets along the waveguide over light-pulse sequences, which can be used to construct guided cold atom inertial sensor systems 900 such as a guided atom accelerometer (e.g., the accelerometer 928).

The EF ODT structure 906 can be constructed with micro/nano fabrication techniques, and the photonic and electronic components can be fabricated by way of integrated photonics manufacturing techniques and electronic integrated circuits manufacturing techniques. Thus, the guided cold atom inertial sensor system 900 can be made to have improved SWaP characteristics relative to a free-space cold atom inertial sensor system. Furthermore, the guided cold atom inertial sensor system 900 can be easier to manufacture to various shapes and configurations of sensors (e.g., arrayed sensors or linearly guided atom accelerometers) as compared to a device that incorporates a tapered optical fiber, which is generally manufactured as a linear shape by high precision fiber-pulling techniques and are not flexible for various shapes and configurations.

Due to the optical absorption loss in a waveguide, thermal dissipation can be a limiting factor to performance of the EF ODT structure 906. For instance, the number of atoms that can be trapped using the EF ODT can increase as the intensity of the attractive and repulsive evanescent fields emanating from the waveguide increases. The intensity of these fields, and in turn the trap depth, is a function of the powers of the red-detuned and blue-detuned trapping beams propagating in the waveguide. However, as the powers of the red-detuned and blue-detuned trapping beams are increased, the optical absorption from the suspended waveguide results in more heat generation that may reach the thermal threshold easily and break the suspended waveguide in vacuum. The vacuum conditions within which the MOT is established (i.e., within the vacuum chamber 908) limits heat dissipation to radiative and conductive means.

FIGS. 11A-11D, 12A-12D, and 13A-13D illustrate various exemplary physical configurations for establishing an EF ODT while dissipating heat generated from a waveguide that is suspended over an opening in a supporting substrate. The heat generated from a waveguide that is disposed on a membrane that is itself deposited on a supporting substrate that has no opening formed therein can be efficiently dissipated in a vacuum. These EF ODT structures 1100, 1200, 1300 are adapted to support high optical power delivery through suspended membrane waveguides without causing mechanical failure of the suspended waveguide in the EF ODT structures 1100, 1200, 1300. Various embodiments of the EF ODT structures 1100, 1200, 1300 have been shown to be capable of producing EF ODTs with a trap depth of between about 300 µK and about 1 mK within a distance of about 200 nanometers of a surface of a waveguide.

Figure 11D:
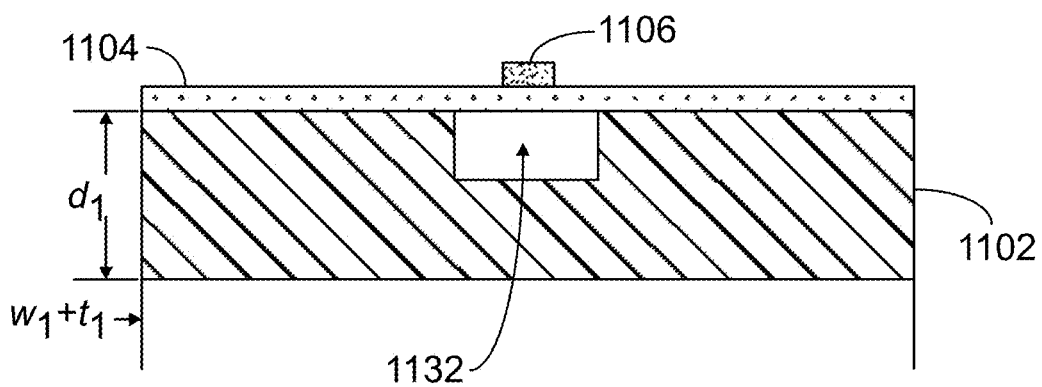

Referring now to FIGS. 11A-11D, the exemplary EF ODT structure 1100 is shown. FIG. 11A depicts a top-down view of the EF ODT structure 1100, FIG. 11B is a thin cross-sectional slice of the EF ODT structure 1100 taken along line B-B shown in FIG. 11A, FIG. 11C is a thin cross-sectional slice of the EF ODT structure 1100 taken along line C-C, and FIG. 11D is a thin cross-sectional slice of the EF ODT structure 1100 taken along line D-D. The EF ODT structure 1100 comprises a supporting substrate 1102 (shown in FIG. 11A as a dashed line), a membrane 1104 supported by the substrate 1102, and a waveguide 1106 that is disposed on and supported by the membrane 1104. The substrate 1102 can be formed from, for example, silicon, silicon dioxide, fused-silica, quartz, or other material that is suitable for forming structures using integrated photonics and electronics manufacturing techniques. In exemplary embodiments, the membrane 1104 and/or waveguide 1106 can be formed from aluminum oxide (alumina), silicon nitride, or aluminum nitride such that the membrane 1104 is substantially transparent to the cooling beams used to form a MOT for the given atomic species.

The substrate 1102 has an opening 1108, alternately referred to herein as the substrate opening, formed therein for the cooling beams, and the membrane 1104 has openings 1118, 1120, alternately referred to herein as the membrane openings, for the MOT atoms. The substrate opening 1108 allows cooling/repump beams that are emitted from a position below the substrate 1102 to reach the membrane 1104 and the waveguide 1106. The membrane openings 1118, 1120 allow MOT atoms to migrate about the waveguide 1106 without striking the membrane 1104.

The waveguide 1106 extends across the substrate opening 1108 from a first side 1110 of the substrate 1102 to a second side 1112 of the substrate 1102, forming an input 1114 and an output 1116 of the waveguide 1106, respectively. The waveguide 1106 is supported by the membrane 1104, which also extends across at least a portion of the substrate opening 1108. The waveguide 1106 is formed on the membrane 1104 as a ridge waveguide such that light propagates in the membrane 1104 and waveguide 1106 confined along the path of the waveguide 1106. The waveguide 1106 is supported by the membrane 1104 throughout the length of the waveguide 1106 in the EF ODT structure 1100. The membrane 1104 and the waveguide 1106 are each suspended over the substrate opening 1108. In other words, within the substrate opening 1108 there is no substrate material supporting the membrane 1104 and/or the waveguide 1106.

The membrane 1104 has the openings 1118, 1120 formed therein. In exemplary embodiments, the membrane 1104 can extend across the entirety of the substrate opening 1108 in the substrate 1102, with the exception of the membrane openings 1118, 1120. The membrane openings 1118, 1120 facilitate migration of atoms from below the membrane 1104 to a MOT 1122 formed above the waveguide 1106, as shown in FIG. 11B. The membrane openings 1118, 1120 therefore define a loading region 1124 for the MOT 1122 and an EF ODT 1126. The EF ODT 1126 can be formed by propagating red-detuned and blue-detuned trapping beams through the waveguide 1106. The red-detuned trapping beam establishes an attractive evanescent field 1128. The blue-detuned trapping beam establishes a repulsive evanescent field 1130. The interaction of the fields 1128, 1130 and the near-surface attractive potential, which are disposed to at least partially overlap with the MOT 1122, establish the EF ODT 1126, and its corresponding trapped states. As indicated in FIG. 11C, the membrane 1104 can extend across the width $w_1$ of the substrate opening 1108 outside of the MOT/EF ODT loading region 1124 (e.g., along line B-B). Collectively, the membrane openings 1118, 1120 form a substantially circular aperture in the membrane 1104. For example, the membrane openings 1118, 1120 can be circular segments positioned on either side of the waveguide 1106 within the loading region 1124.

Referring now to FIGS. 11A and 11D, outside of the substrate opening 1108, a void 1126 can be formed in the substrate 1102 such that the waveguide 1106 is suspended (on the membrane 1104) along the entire length of the waveguide 1106 in the EF ODT structure 1100. Suspension of the waveguide 1106 facilitates confinement of light along the path of the waveguide 1106.

In exemplary embodiments, the substrate 1102 has a void 1132 formed therein. The void 1132 can be positioned below the waveguide 1106 and membrane 1104, such that the waveguide 1106 is suspended throughout its length in the EF ODT structure 1100.

Figure 12A:
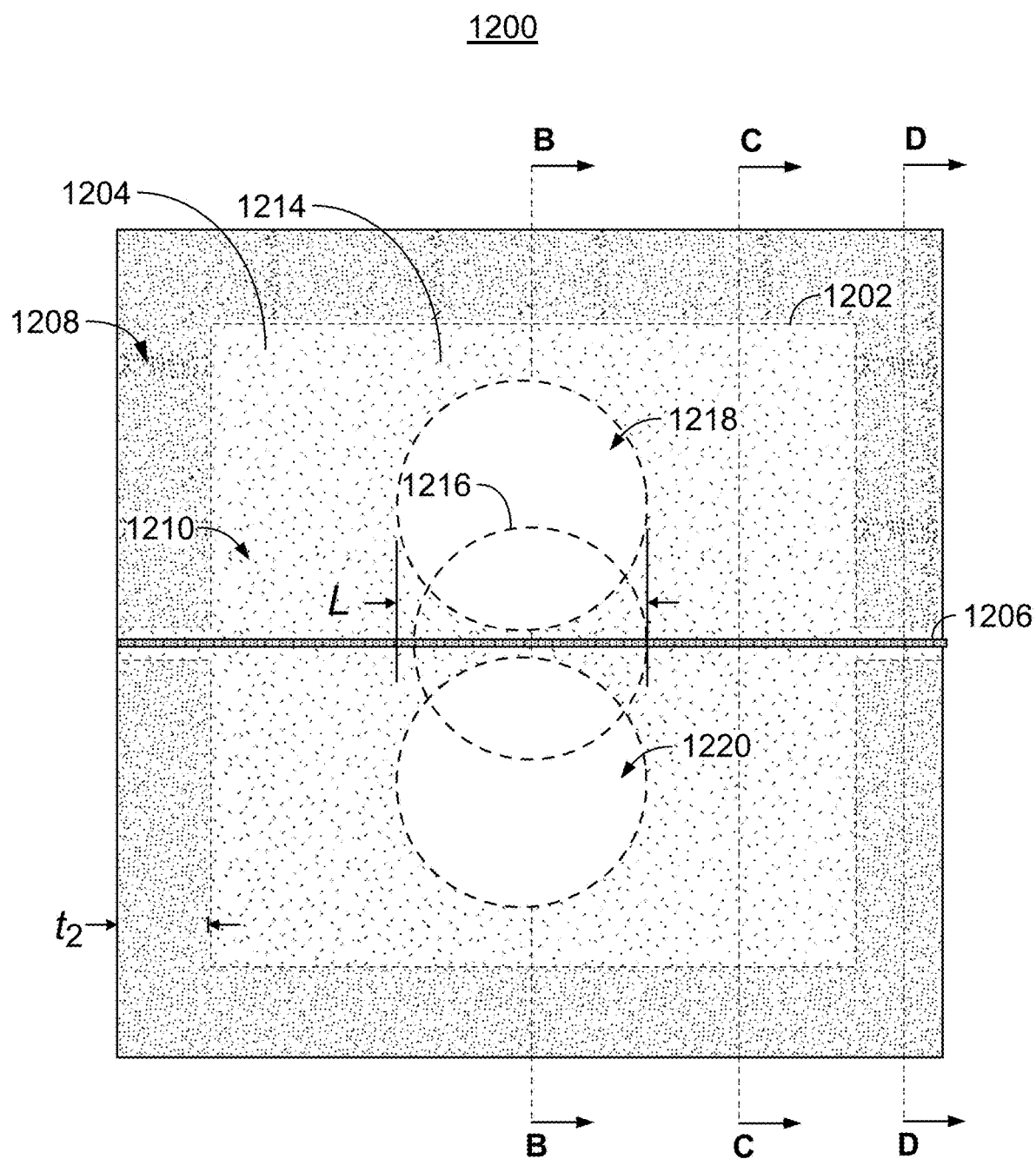
FIGS. 12A-12D illustrate an exemplary EF ODT structure that may be used to implement one or more embodiments of the present invention.
Figure 12B:
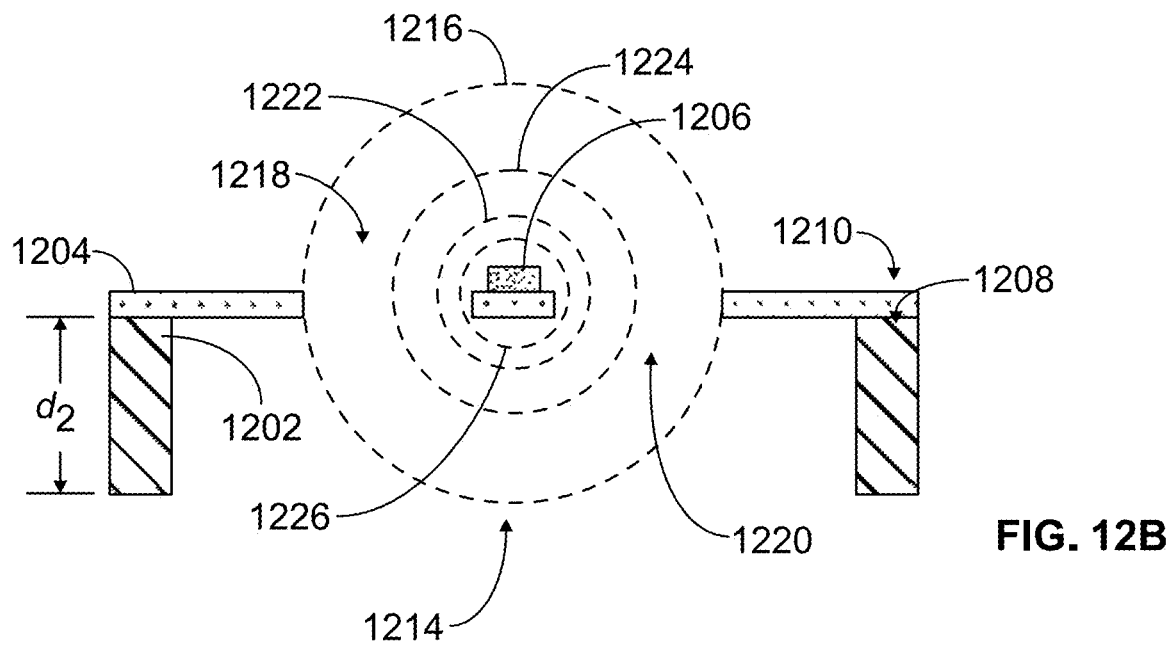
Figure 12C:
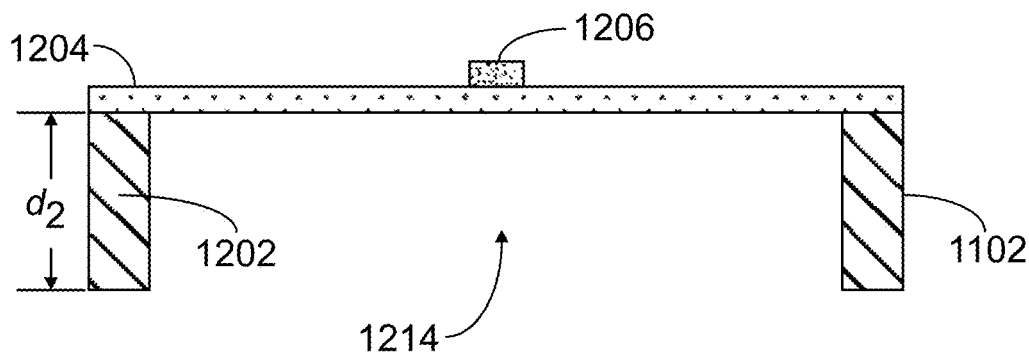
Figure 12D:
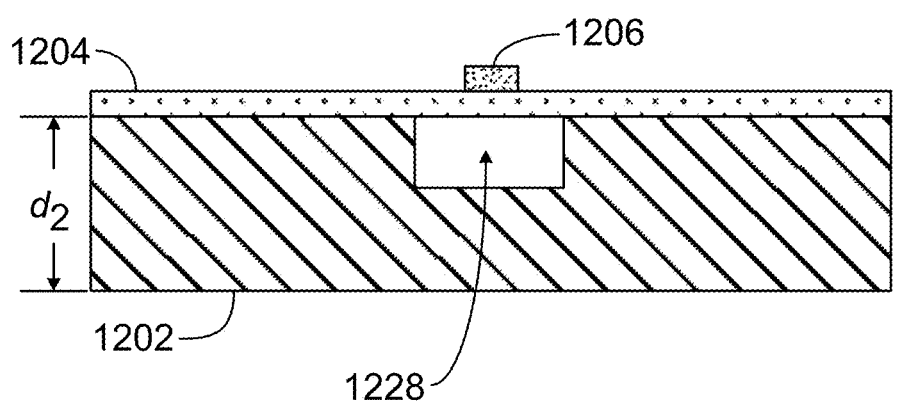

Referring now to FIGS. 12A-12D, the exemplary EF ODT structure 1200 is shown. The EF ODT structure 1200 can be referred to as an infinity configuration. FIG. 12A depicts a top-down view of the EF ODT structure 1200, while FIG. 12B is a cross-sectional thin slice of the EF ODT structure 1200 cut along line B-B shown in FIG. 12A, FIG. 12C is a cross-sectional thin slice of the EF ODT structure 1200 cut along line C-C, and FIG. 12D is a cross-sectional thin slice of the EF ODT structure 1200 cut along line D-D. The EF ODT structure 1200 comprises a supporting substrate 1202 (shown in FIG. 12A as a dashed line), a membrane 1204 supported by the substrate 1202, and a waveguide 1206 that is disposed on and supported by the membrane 1204. The substrate 1202 can be formed from silicon, silicon dioxide, fused-silica, quartz, or other material with which structures can be formed using integrated electronics and integrated photonics manufacturing techniques. The membrane 1204 is supported by the substrate 1202. As with the membrane 1104, the membrane 1204 can, in exemplary embodiments, be formed of aluminum oxide, silicon nitride, or aluminum nitride (or any other transparent membrane materials for the light wavelength of cooling beams used to form a MOT for atoms desirably trapped above the waveguide 1206). The membrane 1204 can be deposited on a surface 1208 of the substrate 1202 such that a surface 1210 of the membrane 1204 is positioned above the surface 1208 of the substrate 1202.

The substrate 1202 has an opening 1214 formed therein. The membrane 1204 is suspended over the substrate opening 1214 formed in the substrate 1202. The membrane 1204 can be substantially transparent to the cooling beams. Thus, at least some of the cooling beams can be emitted through the substrate opening 1214 in the substrate 1202 and through the membrane 1204 to intersect in a region adjacent to or intersecting with the waveguide 1206, forming a MOT 1216 (e.g., a cloud of atoms having an extent shown in FIG. 12B). Atoms disposed about the EF ODT structure 1200 can be drawn into the MOT 1216. The membrane 1204 can have two apertures 1218, 1220 formed therein, allowing atoms that are disposed below the membrane 1204 (e.g., on an opposite side of the membrane 1204 as the waveguide 1206) prior to formation of the MOT 1216 to be loaded into the MOT 1216.

It is to be understood that the region of space encompassed by the cloud of atoms trapped in the MOT 1216 formed above the waveguide 1206 can at least partially intersect with the waveguide 1206 and/or the membrane 1204. However, the center of mass of the MOT 1216 can be positioned offset from the waveguide 1206 or within the waveguide 1206.

The waveguide 1206 is supported by the membrane 1204 and extends across the opening 1214 in the substrate 1202. The apertures 1218, 1220 can be formed in the membrane 1204 on opposite sides of the waveguide 1206, such that the waveguide 1206 extends along the membrane 1204 between the apertures 1218, 1220. The apertures 1218, 1220 yield a tapering of the membrane 1204 material near a center of the opening 1214 in the substrate 1202. In various embodiments, a portion of the waveguide 1206 that is disposed above the opening 1214 in the substrate 1202 can rest solely on the membrane 1204 across the substrate opening 1214. In exemplary embodiments, the apertures 1218, 1220 are substantially circular apertures. However, other aperture geometries are contemplated as being within the scope of the present disclosure.

The red-detuned and blue-detuned trapping beams can be coupled to the waveguide 1206. As described above, propagation of the red-detuned and blue-detuned trapping beams through the waveguide 1206 causes an EF ODT 1222 to be established above the waveguide 1206 and adjacent to the waveguide 1206. The red-detuned trapping beam causes an attractive evanescent field 1224 to be established about the waveguide 1206, and the blue-detuned trapping beam causes a repulsive evanescent field 1226 to be established about the waveguide 1206. The interaction of these fields 1224, 1226 and the attractive near-surface potential establishes the EF ODT 1222, and its corresponding trapped states. The EF ODT 1222 can be positioned closer to the waveguide 1206 than the center of the MOT 1216. While a center of mass of the MOT 1216 and the EF ODT 1222 may be positioned within approximately similar distance to the waveguide 1206, or at an approximately same position, it is to be understood that guided atoms in the EF ODT 1222 will be distributed in closer proximity to the waveguide 1206 than a cloud of atoms trapped in the MOT 1216.

The configuration of the membrane 1204 supports dissipation of heat generated from the waveguide 1206 while facilitating formation of the MOT 1216 such that a cloud of atoms trapped by the MOT 1216 overlaps with the suspended waveguide 1206. The apertures 1218, 1220 in the membrane 1204 allow atoms to move from one side of the membrane 1204 to another (e.g., from a side of the membrane 1204 that is opposite the waveguide 1206 to a same side of the membrane 1204 as the waveguide 1206). Since the waveguide 1206 is deposited on the membrane 1204, the membrane 1204 itself conducts heat away from the waveguide 1206 throughout the length of the waveguide 1206. The taper of the membrane 1204 toward the center of the opening 1214 in the substrate 1202 allows atoms to readily move from one side of the membrane 1204 to another in the region in which the MOT 1216 is formed. The configuration of the membrane 1204 also facilitates greater dissipation of heat dissipated by the waveguide 1206 than a configuration in which the membrane 1204 is strictly conformal to the waveguide 1206. As the red-detuned and blue-detuned trapping beams propagate through the waveguide 1206, optical absorption in the waveguide 1206 causes heat to be dissipated into and through the waveguide 1206. The greater area of the membrane 1204 compared to a waveguide-conformal membrane facilitates conduction of heat away from the waveguide 1206 and provides greater heatsinking ability.

In one embodiment, experimental results have indicated the waveguide 1206 can accommodate an optical signal of at least 30 mW. In this embodiment, a length L of a loading region of the waveguide 1206, taken to be equivalent to a diameter of the apertures 1218, 1220 in the infinity design, was about 125 micrometers. In this embodiment, the membrane 1204 and the opening 1214 in the substrate 1202 were squares of approximately 5 millimeters by 5 millimeters.

The exemplary substrate 1202 and membrane 1204 shown in FIGS. 12A-12D have substantially square or rectangular shapes. For instance, the substrate 1202 has a cubic shape with at least partially open top and bottom faces. The exemplary membrane 1204 depicted in FIGS. 12A-12D has a square slab shape with the apertures 1218, 1220 formed therein. However, it is to be understood that in other embodiments the substrate 1202 and membrane 1204 can have other shapes. For example, the substrate 1202 can have the shape of a cylinder with a partially open top and partial open bottom. In such embodiments, the membrane 1204 can have the shape of a circular slab with the apertures 1218, 1220 formed therein. It is to be understood that the configuration of the substrate 1202 can be adapted to accommodate a selected design of the membrane 1204 and/or the waveguide 1206.

In exemplary embodiments, the substrate 1202 has a void 1228 formed therein. The void 1228 can be positioned below the waveguide 1206 and membrane 1204, such that the waveguide 1206 is suspended throughout its length in the EF ODT structure 1200.

Figure 13A:
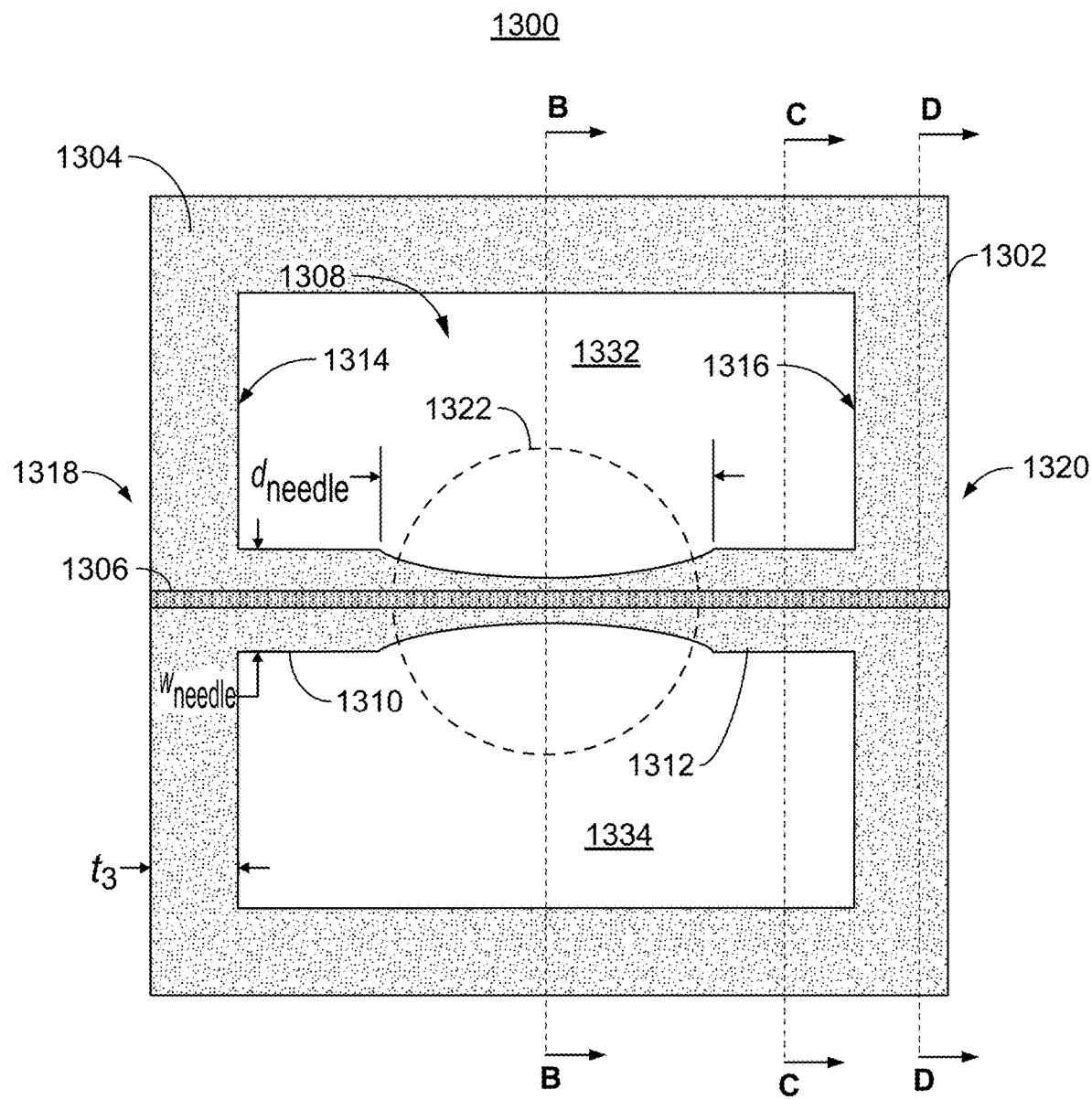
FIGS. 13A-13D illustrate an exemplary EF ODT structure that may be used to implement one or more embodiments of the present invention.
Figure 13B:
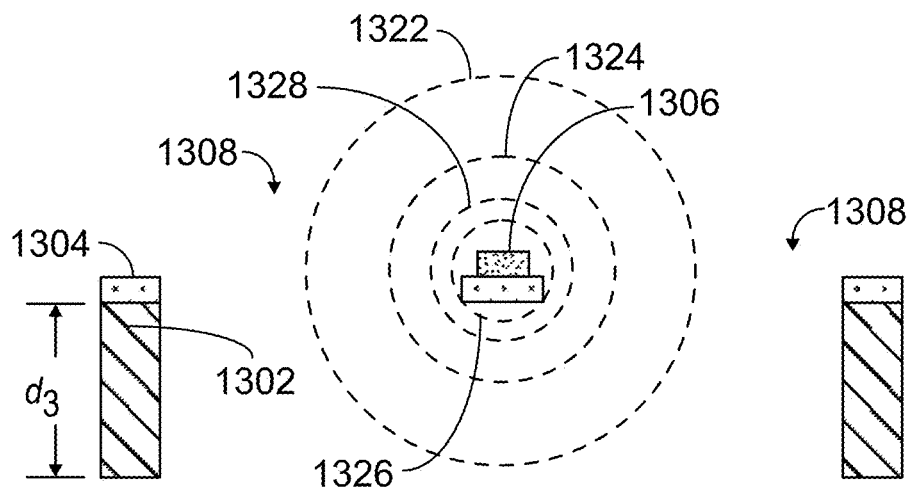
Figure 13C:
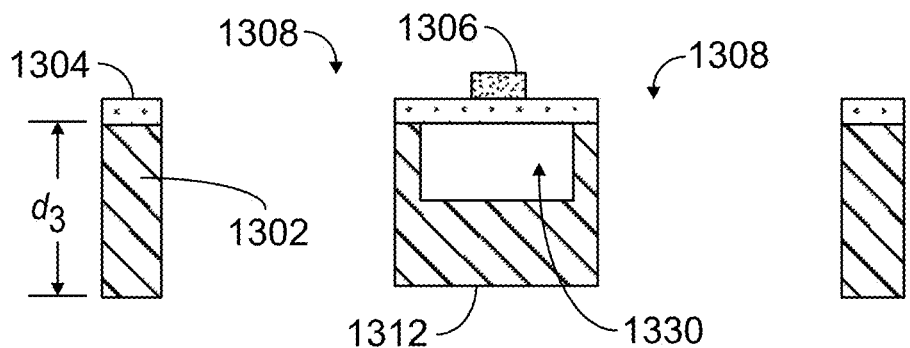
Figure 13D:
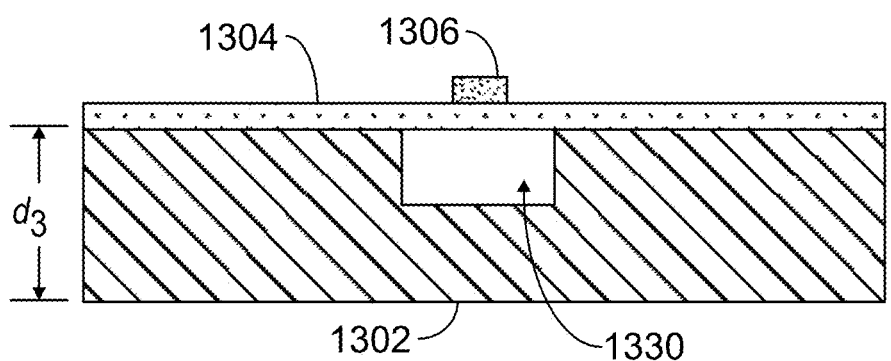

Referring now to FIGS. 13A-13D, the exemplary EF ODT structure 1300 is shown. FIG. 13A depicts a top-down view of the exemplary EF ODT structure 1300. FIG. 13B depicts a cross-sectional thin slice of the EF ODT structure 1300 cut along line B-B shown in FIG. 13A. FIG. 13C depicts a cross-sectional thin slice of the EF ODT structure 1300 cut along line C-C shown in FIG. 13A. FIG. 13D depicts a cross-sectional thin slice of the EF ODT structure 1300 cut along line D-D. The EF ODT structure 1300 includes a substrate 1302, a membrane 1304, and a waveguide 1306 that is disposed on the membrane 1304. The substrate 1302 has an opening 1308 formed therein. The substrate 1302 includes a first needle structure 1310 and a second needle structure 1312 that extend into the opening 1308 in the substrate 1302 from opposite sides of the opening 1308. For example, the EF ODT structure 1300 shown in FIGS. 13A-13D depicts a square opening, and the first needle structure 1310 extends outward into the opening 1308 from a first interior wall 1314 of the substrate 1302. The second needle structure 1312 extends outward into the opening 1308 from a second interior wall 1316 of the substrate 1302, the first interior wall 1314 being opposite the second interior wall 1316. The needle structures 1310, 1312 can be formed from a same material as the substrate 1302 (e.g., silicon, silicon dioxide, fused-silica, quartz, or the like) and can further be monolithically integrated with the substrate 1302 (e.g., formed by etching material from the substrate 1302).

In the exemplary EF ODT structure 1300, the membrane 1304 extends across the opening 1308 in the substrate 1302 between the first needle structure 1310 and the second needle structure 1312. The waveguide 1306 extends across the membrane 1304 and extends further across the needle support structures 1310, 1312 to opposite ends 1318, 1320 of the substrate 1302. The membrane 1304 has a taper toward a center of the waveguide 1306 within the opening 1308 in the substrate 1302. In the exemplary EF ODT structure 1300 shown, a portion of the membrane 1304 that extends between the needle structures 1310, 1312 has a width that is less than or equal to a width $w_{needle}$ of the needle structures 1310, 1312.

In the exemplary EF ODT structure 1300, the membrane 1304 extends only between the two needle structures 1310, 1312. The configuration of the membrane 1304 allows cooling beams to readily pass through the opening 1308 in the substrate 1302 to form a MOT 1322 about the waveguide 1306. Due to the limited extent of the membrane 1304, atoms are also able to readily migrate toward the MOT 1322 without interference from the membrane 1304 due to the presence of much larger apertures 1332, 1334. It is to be understood, however, that the membrane 1304 can instead be adapted to extend across substantially the entirety of the opening 1308 in the substrate 1302, excepting much smaller apertures to allow atom migration, in similar fashion to the apertures 1218, 1220 in the membrane 1204.

As described above with respect to the EF ODT structures 1100, 1200, red-detuned and blue-detuned trapping beams can be coupled into the waveguide 1306. The red-detuned trapping beam establishes an attractive evanescent field 1324 about the waveguide 1306. The blue-detuned trapping beam establishes a repulsive evanescent field 1326 about the waveguide 1306. The interaction of these fields 1324, 1326 and the attractive near-surface potential with atoms trapped in the MOT 1322 establishes an EF ODT 1328, and its corresponding trapped states, about the waveguide 1306.

While the needle structures 1310, 1312 can interfere with transmission of the cooling beams through the opening 1308, or the migration of atoms through the opening 1308, the needle structures 1310, 1312 facilitate conduction of generated heat away from the waveguide 1306 and into the bulk of the substrate 1302. Experimental results have indicated that one embodiment of the EF ODT structure 1300 can support an optical power of 20 mW through the waveguide 1306 when the length of the waveguide 1306 that extends between the needle structures 1310, 1312 is about 250 micrometers.

As shown in FIGS. 13C and 13D, the needle structure 1312 has a void 1330 formed therein, such that the waveguide 1306 and membrane 1304 are suspended over the needle structure 1312 throughout the length of the needle structure 1312. The void 1330 can further extend into the remainder of the substrate 1302 such that the waveguide 1306 is suspended along its entire extent in the EF ODT structure 1300.

In various embodiments, the waveguides 1106, 1206, 1306 of the EF ODT structures 1100, 1200, 1300 can have a thickness (e.g., the thickness $t_{waveguide}$ shown in FIG. 11C) of approximately 150 nanometers or less. In some embodiments, the membranes 1104, 1204, 1304 can be selected to have a thickness that is less than the thickness of the waveguides 1106, 1206, 1306, such that the waveguides 1106, 1206, 1306 are ridge waveguides. In such embodiments, the membranes 1104, 1204, 1304 can have a thickness of approximately 75 nanometers or less. In other embodiments, the membranes 1104, 1204, 1304 can be selected to have a thickness that yields an anti-reflection effect with respect to the cooling beams used to form the MOTs 1122, 1216, 1322. For example, an aluminum oxide (alumina) membrane 1104, 1204, 1304 can be selected to have a thickness of approximately 260 nanometers, which has been shown to result in an anti-reflection effect that yields a transmission of greater than 95% with respect to an 852 nanometer cooling beam that is adapted to cool cesium atoms.

In exemplary embodiments, a distance $d_{needle}$ between the needle structures 1310, 1312 can be approximately 750 micrometers or less. In these and other embodiments, the width $w_{needle}$ of the needle structures 1310, 1312 can be approximately 500 micrometers or less.

Furthermore, the substrates 1102, 1202, 1302 can be configured with features that facilitate sinking heat from the waveguides 1106, 1206, 1306 and/or radiating generated heat. By way of example, substrate depths $d_1$, $d_2$, or $d_3$ or thicknesses $t_1$, $t_2$, or $t_3$ of the substrates 1102, 1202, 1302, respectively, can be selected to improve a thermal threshold (e.g., a failure threshold of the waveguides 1106, 1206, 1306) or yield a desired thermal equilibrium of the waveguides 1106, 1206, 1306 at an operating point of the waveguides 1106, 1206, 1306 (e.g., a given optical input power to establish an EF ODT). In still further embodiments, the substrates 1102, 1202 1302 can include features that are intended to radiate heat away from the waveguides 1106, 1206, 1306 and/or the MOT and EF ODT. For example, the substrates 1102, 1202, 1302 can include fins, ridges, bumps, or other features (not shown) that facilitate radiation of heat.

Additionally, various technologies pertaining to EF ODTs with integrated membrane waveguide platforms are described herein, and in references M. Gehl, et. al., "Characterization of suspended membrane waveguides towards a photonic atom trap integrated platform," Optics Express, vol. 29, no. 9, art. no. 13129 (2021); and J. Lee, et. al., "Demonstration of a MOT in a sub-millimeter membrane hole," Scientific Reports, vol. 11, art. no. 8807 (2021). U.S. patent application Ser. No. 17/569,578, entitled "Guided Cold Atom Inertial Sensors with Membrane Integrated Photonics on Atom Trap Integrated Platforms," and assigned to the same assignee as this application, likewise describes various technologies pertaining to EF ODTs with integrated membrane waveguide platforms.

The small mode area of the EF modes surrounding the waveguides 1106, 1206, 1306 of the EF ODT structures 1100, 1200, 1300, reduces the required optical power of the blue- and red-detuned trapping beams, and the EF-mode Raman beams. This optical power reduction may be by factors of as much $10^5$ to $10^7$ compared to the Gaussian beams of a free-space LPAI accelerometer. Thus, these EF ODT structures 1100, 1200, 1300 enable low SWaP guided LPAI sensors being capable of miniature, multi-axis, arrayed cold-atom inertial sensors.

All publications, including but not limited to patents and patent applications, cited in this specification are herein incorporated by reference as though set forth in their entirety in the present application.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for measuring acceleration comprising the steps of:
    providing a light-pulse atom interferometer (LPAI) accelerometer structure, the LPAI accelerometer structure including a suspended waveguide;
    forming a magneto-optical trap (MOT) about the suspended waveguide;
    laser cooling atoms within a loading region about the suspended waveguide;
    forming an evanescent field optical dipole trap (EF ODT) about the suspended waveguide;
    loading at least a portion of the laser cooled atoms from the loading region into the EF ODT;
    determining an optimal interrogation time ($T_0$) to effect revival of Raman coherence in a measurement of the thus loaded laser cooled atoms;
    undertaking an LPAI optical sequence;
    measuring a population of one or more states of the loaded laser cooled atoms after the LPAI optical sequence;
    repeating the steps of forming a magneto-optical trap through measuring a population to thereby implement at least one of a time-scanning sequence or a phase-scanning sequence; and
    determining an acceleration based upon the measured populations over the at least one of a time-scanning sequence or a phase scanning sequence.

2. The method of claim 1, wherein the LPAI accelerometer structure further includes:
    a substrate having an opening formed therein; and
    a membrane that extends across at least a portion of the opening formed in the substrate;
    wherein the suspended waveguide is disposed on the membrane such that the suspended waveguide is suspended over the opening in the substrate.

3. The method of claim 1, wherein the step of forming a MOT employs a magnetic field system adapted to establish a magnetic field gradient about the suspended waveguide.

4. The method of claim 1, wherein the step of laser cooling atoms includes subjecting an atomic cloud about the suspended waveguide to a plurality of cooling beams.

5. The method of claim 4, wherein the plurality of cooling beams has a wavelength that is red-detuned with respect to a resonant optical transition of the laser cooled atoms.

6. The method of claim 1, wherein the step of forming an EF ODT includes:
    emitting a red-detuned trapping beam such that red-detuned light propagates in the suspended waveguide, the red-detuned trapping beam being red-detuned with respect to a resonant optical transition of the loaded laser cooled atoms; and
    emitting a blue-detuned trapping beam such that blue-detuned light propagates in the suspended waveguide, the blue-detuned trapping beam being blue-detuned with respect to the resonant optical transition of the loaded laser cooled atoms, whereby propagation of the red-detuned light and the blue-detuned light causes formation of the EF-ODT.

7. The method of claim 1, wherein the step of determining $T_0$ includes determining an approximate acceleration using at least one of an inertial measurement unit (IMU) co-sensor or a look-up table based on an EF-mode guided LPAI model or experimental data, wherein $T_0$ is a function of the thus determined approximate acceleration.

8. The method of claim 1, wherein the LPAI optical sequence includes three Raman pulses adapted to respectively separate, redirect, and recombine the loaded laser cooled atoms, the respective separating, redirecting, and recombining along a 1-D axial direction of the suspended waveguide, each of the three Raman pulses including a pair of counter-propagating beams.

9. The method of claim 8,
    wherein a first of the pair of counter-propagating beams is red-detuned with respect to a resonant optical transition of the loaded laser cooled atoms; and
    wherein a second of the pair of counter-propagating beams is blue-detuned with respect to the resonant optical transition of the loaded laser cooled atoms.

10. The method of claim 8, wherein the three Raman pulses include, in order, a $$\frac{\pi}{2}$$

separating pulse, a π redirecting pulse, and a $$\frac{\pi}{2}$$

recombining pulse, with an interrogation time T between the $$\frac{\pi}{2}$$

separating and the π redirecting pulses and between the π redirecting and the $$\frac{\pi}{2}$$

recombining pulses.

11. The method of claim 10, wherein the time-scanning sequence employs a plurality of LPAI optical sequences, each of the plurality of LPAI optical sequences having a corresponding interrogation time T equal to $T_0$ plus a corresponding time-scanning factor δT.

12. The method of claim 11, wherein each of the corresponding time-scanning factors δT falls within a range of one of ±10% $T_0$, ±25% $T_0$, or 50% $T_0$.

13. The method of claim 10, wherein the phase-scanning sequence employs a plurality of LPAI optical sequences, each of the plurality of LPAI optical sequences having a $$\frac{\pi}{2}$$

recombining pulse with a respective phase δφ corresponding to a phase of the microwave beat-note frequency of the two counter-propagating Raman beams.

14. The method of claim 13, wherein the respective phase δφ for each of the plurality of LPAI optical sequences falls within a range of 0 to 2π.

15. The method of claim 1, wherein the step of measuring a population includes:
   emitting a probe beam, the probe beam adapted to interact with the loaded laser cooled atoms, wherein interaction of the probe beam with the loaded laser cooled atoms is indicative of a probability associated with a state of the loaded laser cooled atoms, the probability based upon the motion of the loaded laser cooled atoms; and
   detecting the thus interacted probe beam.

16. The method of claim 15, wherein a wavelength of the probe beam corresponds to a resonant optical transition of the loaded laser cooled atoms.

17. An accelerometer comprising:
   a light-pulse atom interferometer (LPAI) accelerometer structure, the LPAI accelerometer structure including a suspended waveguide;
   a magnetic field system adapted to establish a magnetic field gradient about the suspended waveguide;
   a laser system, the laser system adapted to:
      emit a red-detuned trapping beam such that red-detuned light propagates in the suspended waveguide, the red-detuned trapping beam being red-detuned with respect to a resonant optical transition of atoms in an atomic cloud about the suspended waveguide;
      emit a blue-detuned trapping beam such that blue-detuned light propagates in the suspended waveguide, the blue-detuned trapping beam being blue-detuned with respect to the resonant optical transition of atoms in the atomic cloud about the suspended waveguide, whereby propagation of the red-detuned light and the blue-detuned light causes formation of an evanescent field-optical dipole trap (EF-ODT);
      emit a plurality of orthogonal or counter-propagating cooling beams having a wavelength that is blue-detuned with respect to the resonant optical transition of atoms in the atomic cloud about the suspended waveguide, the plurality of orthogonal or counter-propagating cooling beams adapted to cool the atoms in the atomic cloud about the suspended waveguide thereby creating laser cooled atoms, at least a portion of the laser cooled atoms from the atomic cloud being loaded into the EF-ODT thereby creating loaded laser cooled atoms;
      emit a first of a pair of Raman counter-propagating beams, the first of the pair of Raman counter-propagating beams being red-detuned with respect to a resonant optical transition of the laser cooled atoms;
      emit a second of the pair of Raman counter-propagating beams, the second of the pair of Raman counter-propagating beams being blue-detuned with respect to the resonant optical transition of the laser cooled atoms; and
      emit a probe beam having a wavelength corresponding to the resonant optical transition of the laser cooled atoms, the probe beam interacting with the loaded laser cooled atoms;
   an optical detector adapted to detect the thus interacted probe beam;
   an inertial measurement unit co-sensor adapted to determine an approximate acceleration; and
   a processor, the processor adapted to undertake the steps of:
      determining an optimal interrogation time ($T_0$) to effect revival of Raman coherence in a measurement of the loaded laser cooled atoms based upon the approximate acceleration;
      commanding the laser system to undertake an LPAI optical sequence, the LPAI optical sequence including three Raman pulses adapted to respectively separate, redirect, and recombine the loaded laser cooled atoms, the respective separating, redirecting, and recombining along a 1-D axial direction of the suspended waveguide, each of the three Raman pulses including the pair of Raman counter-propagating beams, the LPAI optical sequence placing a first portion of the loaded laser cooled atoms in a first state and a second portion of the loaded laser cooled atoms in a second state;
      determining a population of one or more of the first or second states of the loaded laser cooled atoms after the LPAI optical sequence based upon an output of the optical detector;
      repeating the steps of commanding the laser system to undertake an LPAI optical sequence and determining a population to thereby implement at least one of a time-scanning sequence or a phase-scanning sequence; and
      determining an acceleration based upon the measured populations over the at least one of a time-scanning sequence or a phase scanning sequence.

18. The accelerometer of claim 17, wherein the three Raman pulses include, in order, a $\frac{\pi}{2}$ separating pulse, a $\pi$ redirecting pulse, and a $\frac{\pi}{2}$ recombining pulse, with an interrogation time T between the $\frac{\pi}{2}$ separating and the $\pi$ redirecting pulses and between the $\pi$ redirecting and the $\frac{\pi}{2}$ recombining pulses.

19. The accelerometer of claim 17, wherein the time-scanning sequence about $T_0$ employs a plurality of LPAI optical sequences, each of the plurality of LPAI optical sequences having a corresponding interrogation time T equal to $T_0$ plus a corresponding time-scanning factor $\delta T$, each of the corresponding time-scanning factors $\delta T$ falling within a range of one of $\pm 10\%$ $T_0$, $\pm 25\%$ $T_0$, or $\pm 50\%$ $T_0$.

20. The accelerometer of claim 17, wherein the phase-scanning sequence employs a plurality of LPAI optical sequences, each of the plurality of LPAI optical sequences having a $\frac{\pi}{2}$ recombining pulse with a respective phase $\delta\varphi$ corresponding to a phase of the microwave beat-note frequency of the two counter-propagating Raman beams, the respective phase $\delta\varphi$ for each of the plurality of LPAI optical sequences falling within a range of 0 to $2\pi$.

* * * * *